(12) United States Patent
Musiani et al.

(10) Patent No.: US 11,941,863 B2
(45) Date of Patent: Mar. 26, 2024

(54) IMAGING SYSTEM AND METHOD USING A MULTI-LAYER MODEL APPROACH TO PROVIDE ROBUST OBJECT DETECTION

(71) Applicant: Datalogic IP Tech S.r.l., Lippo de Calderara di Reno (IT)

(72) Inventors: Roberto Musiani, Monte San Pietro (IT); Alessandro Franchi, Bologna (IT); Maurizio De Girolami, Calderara di Reno (IT); Angelo Carraggi, Zola Predosa (IT)

(73) Assignee: Datalogic IP Tech S.r.l., Lippo de Calderara di Reno (IT)

( * ) Notice: Subject to any disclaimer, the term of this patent is extended or adjusted under 35 U.S.C. 154(b) by 221 days.

(21) Appl. No.: 17/394,358

(22) Filed: Aug. 4, 2021

(65) Prior Publication Data
US 2023/0038286 A1 Feb. 9, 2023

(51) Int. Cl.
*G06V 10/75* (2022.01)
*G06F 18/22* (2023.01)
(Continued)

(52) U.S. Cl.
CPC ............ *G06V 10/751* (2022.01); *G06F 18/22* (2023.01); *G06V 10/44* (2022.01); *G06V 10/74* (2022.01); *G06V 30/2504* (2022.01)

(58) Field of Classification Search
CPC ...... G06V 10/751; G06V 10/44; G06V 10/74; G06V 30/2504; G06V 10/46; G06V 10/255; G06F 18/22
See application file for complete search history.

(56) References Cited

U.S. PATENT DOCUMENTS 4,920,572 A * 4/1990 Sugita .................... B25J 9/1697
382/152
6,175,648 B1 * 1/2001 Ayache .................. G06V 10/10
348/42

(Continued)

FOREIGN PATENT DOCUMENTS

EP       3 206 164 A1    8/2017

OTHER PUBLICATIONS

Extended European Search Report for EP 22187134.6 dated Dec. 13, 2022, 14 pgs.

(Continued)

*Primary Examiner* — Aaron W Carter
(74) *Attorney, Agent, or Firm* — Foley & Lardner LLP

(57) ABSTRACT

A system and method of detecting an image of a template object in a captured image may include comparing, by a processor, an image model of an imaged template object to multiple locations, rotations, and scales in the captured image. The image model may be defined by multiple model base point sets derived from contours of the imaged template object, where each model base point set inclusive of a plurality of model base points that are positioned at corresponding locations associated with distinctive features of the imaged template object. Each corresponding model base point of the model base point sets may (i) be associated with respective layers and (ii) have an associated gradient vector. A determination may be made as to whether and where the image of the object described by the image model is located in the captured image.

20 Claims, 19 Drawing Sheets

(51) Int. Cl.
*G06V 10/44* (2022.01)
*G06V 10/74* (2022.01)
*G06V 30/24* (2022.01)

(56) References Cited

U.S. PATENT DOCUMENTS

| | | | | |
|---|---|---|---|---|
| 6,711,293 | B1* | 3/2004 | Lowe | G06T 7/73 |
| | | | | 382/220 |
| 6,931,154 | B1* | 8/2005 | Bober | G06V 10/46 |
| | | | | 382/199 |
| 7,016,539 | B1* | 3/2006 | Silver | G06V 10/469 |
| | | | | 382/216 |
| 7,062,093 | B2 | 6/2006 | Steger | |
| 7,190,834 | B2 | 3/2007 | Davis | |
| 7,239,929 | B2 | 7/2007 | Ulrich et al. | |
| 8,081,820 | B2 | 12/2011 | Davis et al. | |
| 8,260,059 | B2 | 9/2012 | Hofhauser et al. | |
| 8,345,979 | B2 | 1/2013 | Davis | |
| 8,478,077 | B2* | 7/2013 | Liu | G06V 40/161 |
| | | | | 382/285 |
| 8,593,452 | B2* | 11/2013 | Solem | G06V 10/7557 |
| | | | | 345/582 |
| 9,147,252 | B2 | 9/2015 | Davis et al. | |
| 9,418,283 | B1* | 8/2016 | Natarajan | G06V 10/32 |
| 9,424,470 | B1* | 8/2016 | Hinterstoisser | B25J 9/0093 |
| 9,805,443 | B2* | 10/2017 | Kitajima | G06T 1/60 |
| 9,978,138 | B2 | 5/2018 | Konishi | |
| 10,311,833 | B1* | 6/2019 | Qiu | G09G 3/003 |
| 10,572,762 | B2* | 2/2020 | Kitajima | G06V 30/2504 |
| 2002/0057838 | A1* | 5/2002 | Steger | G06V 10/7515 |
| | | | | 382/197 |
| 2004/0012794 | A1* | 1/2004 | Nahum | G01D 5/34776 |
| | | | | 356/620 |
| 2006/0233423 | A1* | 10/2006 | Najafi | G06T 7/75 |
| | | | | 382/103 |
| 2008/0065613 | A1* | 3/2008 | Bober | G06V 10/752 |
| 2009/0096790 | A1* | 4/2009 | Wiedemann | G06F 18/28 |
| | | | | 345/427 |
| 2009/0185715 | A1* | 7/2009 | Hofhauser | G06V 10/754 |
| | | | | 382/103 |
| 2012/0082385 | A1* | 4/2012 | Xu | G06V 30/2504 |
| | | | | 382/199 |
| 2014/0098988 | A1* | 4/2014 | Brandt | G06V 40/171 |
| | | | | 382/103 |
| 2014/0099031 | A1* | 4/2014 | Brandt | G06V 10/7553 |
| | | | | 382/201 |
| 2015/0003741 | A1* | 1/2015 | Zhang | G06V 20/176 |
| | | | | 382/199 |
| 2015/0363663 | A1* | 12/2015 | Tombari | G06V 10/50 |
| | | | | 382/170 |
| 2016/0148074 | A1* | 5/2016 | Jean | G06F 16/5854 |
| | | | | 382/190 |
| 2017/0236263 | A1* | 8/2017 | Bogan | G06T 7/001 |
| | | | | 382/152 |
| 2018/0157931 | A1* | 6/2018 | D'Ercoli | G06V 10/462 |
| 2018/0336699 | A1* | 11/2018 | Böttger | G06T 3/0006 |
| 2018/0365853 | A1* | 12/2018 | Yang | G06T 7/75 |
| 2019/0026917 | A1* | 1/2019 | Liao | G06F 18/22 |
| 2019/0197196 | A1* | 6/2019 | Yang | G06F 30/00 |
| 2019/0244021 | A1* | 8/2019 | Franchi | G06V 10/46 |
| 2022/0147743 | A1* | 5/2022 | Roy | G06V 10/82 |
| 2023/0038286 | A1* | 2/2023 | Musiani | G06V 10/74 |

OTHER PUBLICATIONS

Xiang Bai et al.: "Shape band: A deformable object detection approach", 2009 IEEE Conference on Computer Vision and Pattern Recognition, Jun. 20, 2009, pp. 1335-1342, ZP031607070, ISBN: 978-1-4244-3992-8, 8 pgs.

* cited by examiner

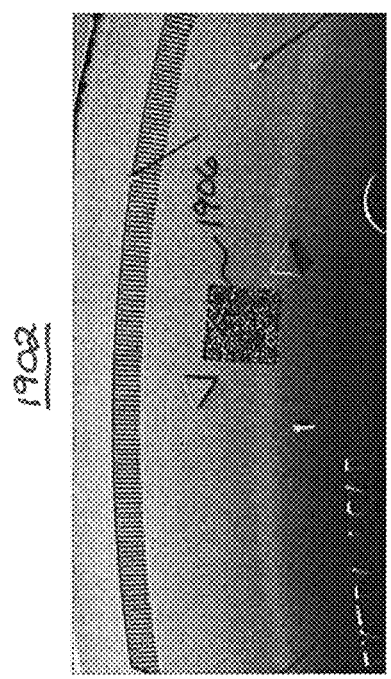
FIG. 19A
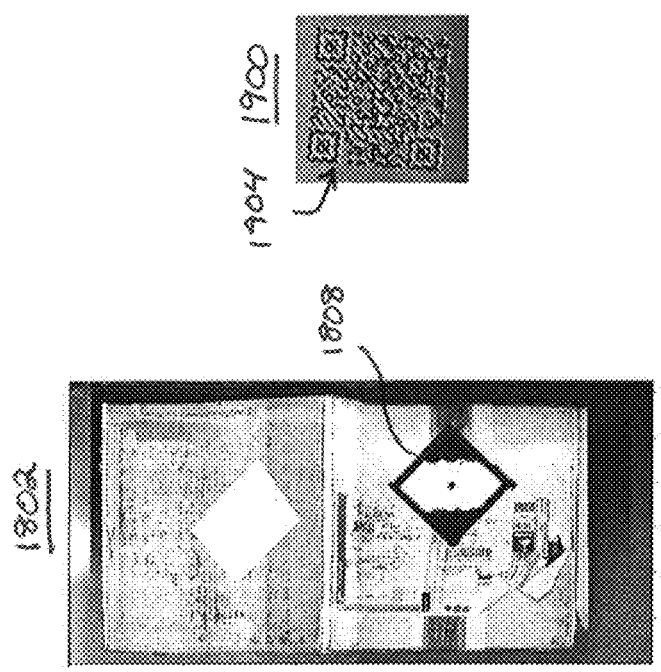
FIG. 19B
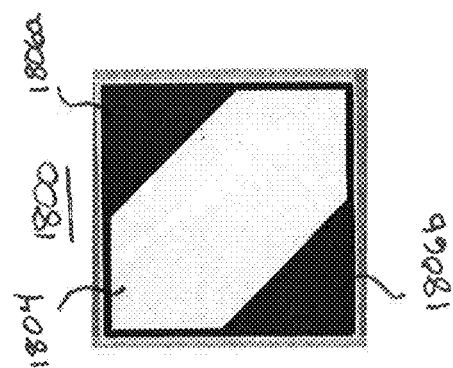
FIG. 18A
FIG. 18B

IMAGING SYSTEM AND METHOD USING A MULTI-LAYER MODEL APPROACH TO PROVIDE ROBUST OBJECT DETECTION

BACKGROUND

Machine vision applications need to seamlessly manage real-world complexity and variability, including point-of-view changes, deformations, and other changes to product packages and parcels that are often subject to machine vision imaging. To accomplish the goal of managing real-world variations when imaging by vision systems, vision systems have to provide robust solutions so as to guarantee a high-degree of tolerance to tackle variability of inspected scenes.

Object localization is often the initial step in machine vision applications, such as defects/flaw detection, gauging, items count, barcode reading, OCR/OCV, robot guidance and other applications. To support these machine vision applications, it is necessary to analyze the fine local features of a given target so, before an item or object can be carefully inspected, the item can be accurately located in an image and then further local processing steps may be applied.

Template matching is a high-level machine vision technique that allows for the identification of portions of an image that match a given image pattern of a template object. Some wide-spread applications, including matching object-to-location and edge detection of images, may be employed to many industrial fields. In other words, image matching is a fundamental function of computer or machine vision.

To provide image localization capabilities, a current industry standard is to use template matching techniques. Existing template matching techniques have proven to be both effective and efficient. Pattern matching applications generally make use of a rigid template (appearance or shape-based) in a sliding window framework. Pattern matching approaches are a computationally efficient way to evaluate a similarity metric between a pre-stored template model and an image area. In real-world applications, due to many deformation sources, such as: (i) raster discretization, (ii) scale changes, (iii) rotation in depth, (iv) perspective distortion, (v) point-of-view distortions, and (vi) small objects deformation, the items in images only rarely maintain the exact same shape or appearance of an original template object, which results in lower similarity metric scores. Because of the lower similarity metric scores, a reduced impact on the overall detection capabilities of vision systems result, thereby significantly limiting the number of applications that are manageable with the current template matching technology.

To solve the problem of real-world variations of items in a seamless way, a robust pattern matching technology capable of handling a certain degree of model distortion is needed. Non-rigid structures, such as consumer packages, are easily deformed. Deformation may be present in many other use cases, so deformation tolerant pattern matching would enhance robustness of vision applications, thereby enabling many more diverse vision applications.

Moreover, images may be captured from varying points-of-view, which similarly leads to image model matching challenges. Deformation tolerant pattern matching may also be utilized in situations where varying image capture points-of-view occur. Varying points-of-view may occur when multiple cameras are used to image products or parcels or moving on a conveyer belt or inventory inspection, for example.

Conventional shape matching has used "rigid models," while being fast and effective in some applications, have practical limitations due to sensitivity to shape variations. In many applications, due to viewpoint changes or large intra-class variation among objects, the rigid template matching approach is not feasible. Hence, more advanced template matching techniques are needed.

Managing template deformations in a template matching framework has a long research history and several approaches have been proposed since the 1970s. A practical taxonomy classifies the explored solutions for managing template deformations, as follows:
  (1) Rigid template matching:
    (a) Appearance-based: NCC, SAD, SSD, etc.
    (b) Shape-based: contour based matching
  (2) Deformable template matching:
    (a) Freeform deformable templates (snakes)
    (b) Parametric deformable templates
    (c) Part-based search approaches One conventional intuitive technique to support deformable template matching is to represent objects as a collection of distinctive parts (e.g., shaped blocks) interconnected by flexible components (e.g., springs). Such schemes model both the relative positions of the parts as well as their appearance, giving a sparse representation that captures the essence of the object. The issue with deformable template matching techniques is that processing the image models are quite computationally intensive. As such, to make deformation management commercially viable, particularly on embedded devices, more efficient deformable template matching approaches are needed.

SUMMARY

To deliver robust and effective applications of computer vision-enabled devices with simple setups in terms of camera position, lighting, and efficient application software, robust vision technologies that are capable of handling a high degree of uncertainty posed by the real-world environment in which (i) items are non-rigid or flexible and/or (ii) image capture occurs from different points-of-view are presented herein. Object localization is an initial step in many inspection applications, and is to be particularly robust and effective to avoid becoming a processing pipeline bottleneck. As such, advanced image pattern or template matching technology may be utilized.

A certain range of object deformations may be managed using traditional shape-based template matching techniques, by extending the shape-based template matching techniques. In an embodiment, a traditional template matching pipeline may be extended to include two phases: (i) a training phase: given one or more images of a target item or object, a model of the relevant features of the item itself may be generated to produce a band in which deformable distinctive contours of a model object may physically range (see FIG. 2), and (ii) runtime phase: using the previously generated image model with a band, instances in runtime images may be searched by applying an actuation function that complements a traditional similarity metric by adding capability to manage a certain level of positional uncertainty to accommodate for real-world object deformation. Utilizing the extended approach opens up a broad range of applications, where scale variations and minor shape deformations make traditional template matching techniques ineffective.

One embodiment of a computer-implemented method of detecting an image of a template object in a captured image may include comparing, by a processor, an image model of an imaged template object to multiple locations, rotations, and scales in the captured image. The image model may be defined by multiple model base point sets derived from contours of the imaged template object, where each model base point set inclusive of a plurality of model base points that are positioned at corresponding locations associated with distinctive features of the imaged template object. Each corresponding model base point of the model base point sets may (i) be associated with respective layers and (ii) have an associated gradient vector. A determination may be made by the processor based on the comparison of the image model to the multiple locations, rotations, and scales in the captured image, as to whether and where the image of the object described by the image model is located in the captured image.

One embodiment of a system for detecting an image of a template object in a captured image may include an imager configured to capture images. A non-transitory memory may be in electrical communication with the imager, and be configured to store images of objects captured by the imager. A processor may be in electrical communication with the imager and non-transitory memory, and be configured to compare an image model of an imaged template object to multiple locations, rotations, and scales in the captured image. The image model may be defined by multiple model base point sets derived from contours of the imaged object, where each model base point set may be inclusive of a plurality of model base points that are positioned at corresponding locations associated with distinctive features of the imaged template object. Each corresponding model base point of the model base point sets may (i) be associated with respective layers and (ii) have an associated gradient vector. The processor may further be configured to determine, based on the comparison of the image model to the multiple locations, rotations, and scales in the captured image, whether and where the image of the object described by the image model is located in the captured image.

BRIEF DESCRIPTION OF THE DRAWINGS

Illustrative embodiments of the present disclosure are described in detail below with reference to the attached drawing figures, which are incorporated by reference herein and wherein:

FIG. 9 is a set of illustrations showing a pair of sets of images that show a comparison of identified items in the respective images that are identified with deformation management OFF and deformation management ON;

FIGS. 18A and 18B are illustrations of an illustrative template object and illustrative image with a number of features; and FIGS. 19A and 19B are illustrations of an illustrative template object and illustrative image with a number of features;

DETAILED DESCRIPTION

Figure 1:
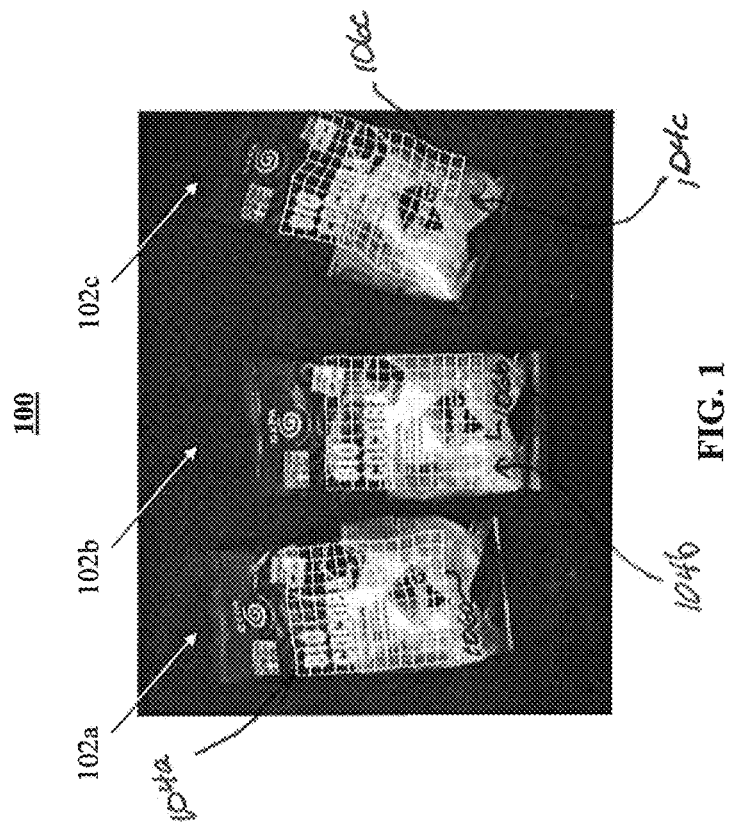
FIG. 1 is an illustration of an illustrative flexible item imaged in three different shapes using computer vision for identification.

With regard to FIG. 1, an illustration of an illustrative flexible item 100 imaged in three different shapes 102a, 102b, and 102c (collectively 102) using computer vision for identification is shown. The different shaped items 102 are consumer packages of a product that is contained in common non-rigid or flexible bags 104a-104c (collectively 104). Grid overlays 106a-106c (collectively 106) that show gradients by distorted grid lines to represent variations of the flexible bags 104. In order to accurately identify the items 102 with the distorted shapes of the flexible bags 104, a robust pattern matching process that includes training and runtime phases that support matching variations of the flexible bags 104 while avoiding complex computational processing may be performed. The robust pattern matching process enables real-time, high-speed item identification of the items 102, thereby to supporting a wide variety of use cases.

Template matching processes that support vision tools that provide simple and robust solutions for use cases, including identification tasks, inspections, retail product identification, industrial vision, Internet of things (IoT) applications, and so on are presented herein. The template matching processes described herein provide robust computationally efficient, and easily deployable processes, thereby enabling a significantly extended range of possible vision-based applications with low system setup complexity and cost is achieved. Moreover, by providing robust pattern matching processes that are capable of supporting variations of the appearance of items, imaging systems with object detection in real-world applications may be more readily realized, thereby becoming more widely utilized. The principles described herein aim to extend the range of applications that utilize template matching by leveraging several features, by:

(i) extending the traditional rigid shape model framework by adding efficient means (layers, hybrid model) to add a certain degree of elasticity to the model itself to tackle small freeform shape changes;

(ii) devising a similarity metric that is able to leverage in a flexible way the richer model previously built; and (iii) providing a full spectrum of possibilities and means to manage various degrees of deformation and to compute useful deformation metrics to support real-world applications (deformation field, probes voting, outliers).

Figure 2:
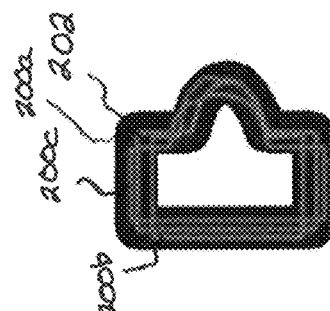
FIG. 2 is an illustration of outer shape profiles of an illustrative non-rigid item with scale variations and minor shape deformations range within a band or envelope.
Figure 2:
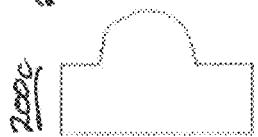
Figure 2:
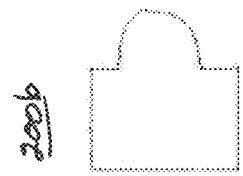
Figure 2:
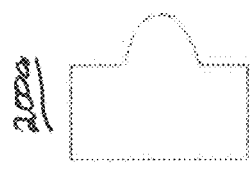

With regard to FIG. 2, an illustration of outer shape profiles 200a-200c (collectively 200) of an illustrative non-rigid item with scale variations and minor shape deformations that range within a band or envelope 202 are shown. By defining a band 202 within which the profile 200 of the non-rigid item may range due to deformation or different point-of-view imaging by adding positional tolerance, robustness of a pattern matching model may be achieved.

With regard to FIG. 3, an illustration of an illustrative template image 300 of an illustrative template object or item 302 to be modeled for later identifying the template item 302 during computer vision applications is shown. A region of interest 304 may be used to isolate and/or enlarge the item 302 or portion thereof. Traditional template matching processes generally rely on the following two learning and runtime phases:

1. Model learning phase: starting from the template image of the item, the system may extract distinctive features, which are basically contour points and gradient direction information (see FIGS. 4A and 4B, for example) to be used at runtime to locate the object in an image. To speed up and increase robustness of the model search phase, a multi-scale/multi-level model may be built to leverage a coarse-to-fine search approach.

2. Model search/runtime phase: using a sliding windows approach, a similarity metric may be computed using the multi-scale/multi-level model and the runtime image features to build a score map, where peaks of the score map suggest the presence of an image structure similar to the image model. The search may be increased in speed by using a coarse-to-fine approach using a pyramid framework, for example.

For the purpose of this application, the following definitions may be used:

Score Map: given a model (or a level of the model pyramid) composed of N points, a score map is a map with a size related to the size of a processed image (or current pyramid layer) containing for every pixel (considered as the center of gravity of the model) a score calculated as the mean (calculated over N points) of the similarity recorded for every model point with the underlined image point. Basically, every point/pixel of the score map reports the probability of the presence of the model object posed with the barycenter in that pixel.

Score Curve: given a multilayer model that is also considered a "score curve," similarity scores computed on a "model base point set" is the scores of all the model points included in that particular base point set that extend across all model layers. The score curve is used to evaluate which model layer (given the current object instance deformation) has the best similarity score for the previously described base point set that will be used as "the model point score" for that particular model point when computing the score map. Basically, a score curve may be determined for every model point aggregating the similarity of the model layers and hence the instance deformation.

As previously described, the traditional template matching processes have certain shortcomings as a result of real-world deformations of non-rigid items and images being captured from different points-of-view. As such, a framework of the template matching process may be extended with additional processing that adds information to the model to be used to manage a certain degree of deformation.

In particular, the traditional template matching processes may be extended, as follows:

1. Extend Model Learning Phase: to reduce the deformation sensitivity for every model point, which are selected starting from original model shape contours and are called "base points" in the following illustrative process:

a. Add positional tolerance by enlarging original contours to a "band" with a selectable width (see FIGS. 4C and 4D);

b. In practice, for every model point, enlarge the model in the gradient direction by adding multiple inner and/or outer contours layers, as shown in FIG. 4E, to the original base contours, as shown in FIG. 4A, to create a "base point set" (see FIG. 6). It should be understood that having a multiple layers model, which basically functions as having multiple different scale models, would not be of much help to manage freeform deformations if the layers were used separately from one another. However, at runtime, a specific strategy may be used to leverage the added model data.

2. Extend Model Search/Runtime Phase: at run time, by performing the extended model learning phase, an extended positional tolerance process for detecting an object may be performed by:

a. Adopting an activation function designed to extract, for every "base point set" of the model, the best matching position inside the set, as provided in step 2(b) below.

b. Computing a similarity measure for every point of the base point set. The similarity measures of the points are eventually filtered with an appropriate probability weighting filter (e.g., Gaussian weighting) so as to produce an activation curve. A maximum activation/similarity value in the activation curve is determined as the best matching position for the model point under consideration (see FIG. 8).

By performing a similarity measure for every point of the base point set, positional tolerance for every original model point may be provided. Moreover, the extended model may be used in a multiscale setting for each level of a pyramid or may be adopted for the lower pyramid levels, which are more sensitive to deformation.

Figure 10:
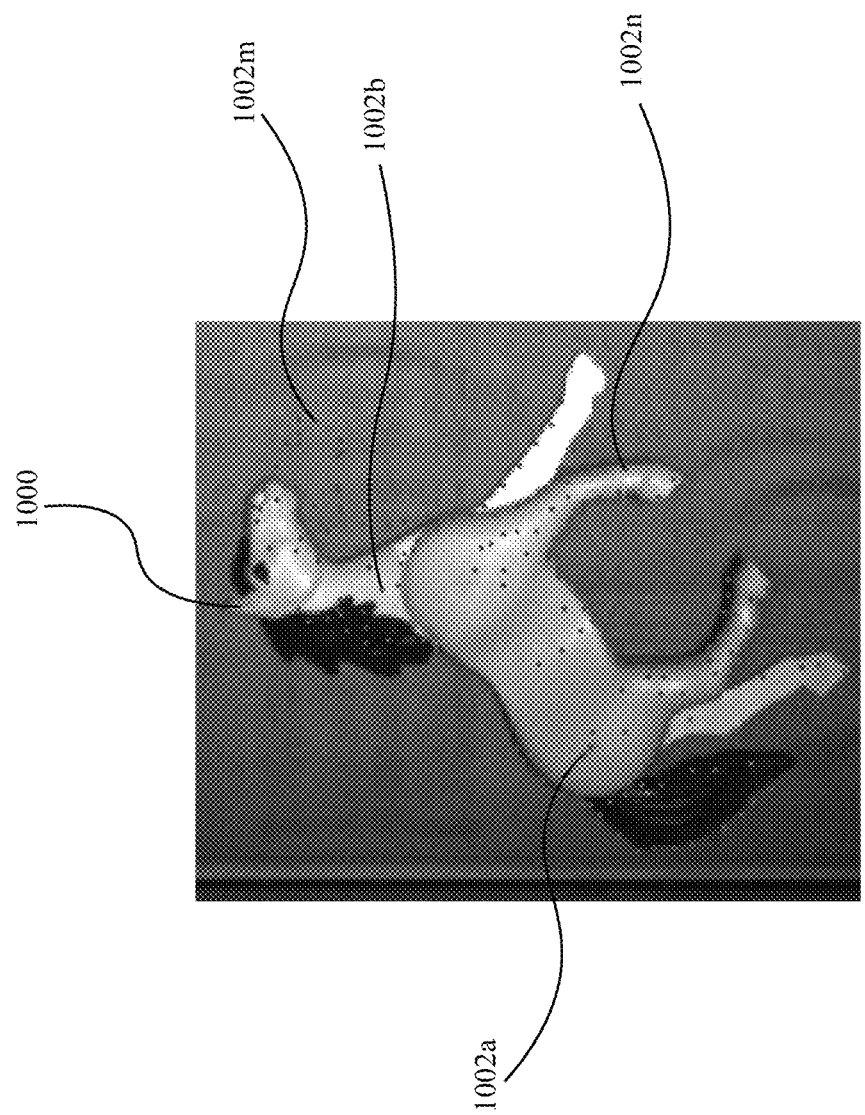
FIG. 10 is an illustration of an illustrative deformable object in which model base points are disposed on and off the deformable object.

3. Besides the added detection robustness, the extended matching process may provide an activation contour/deformation field, as shown in FIG. 10, and the ability to infer even more information about the detected item, such as level of deformation/integrity, deformed region, etc., may also be possible. By interpolating activation function scores, a more accurate deformation value may be estimated as a subpixel position. In this way, at the cost of some overhead during the model learning phase, a certain degree of distortion inside a selected deformation band (see FIG. 2) may be tolerated, thereby adding robustness to the object detection and identification process, during the runtime phase.

Figure 4B:
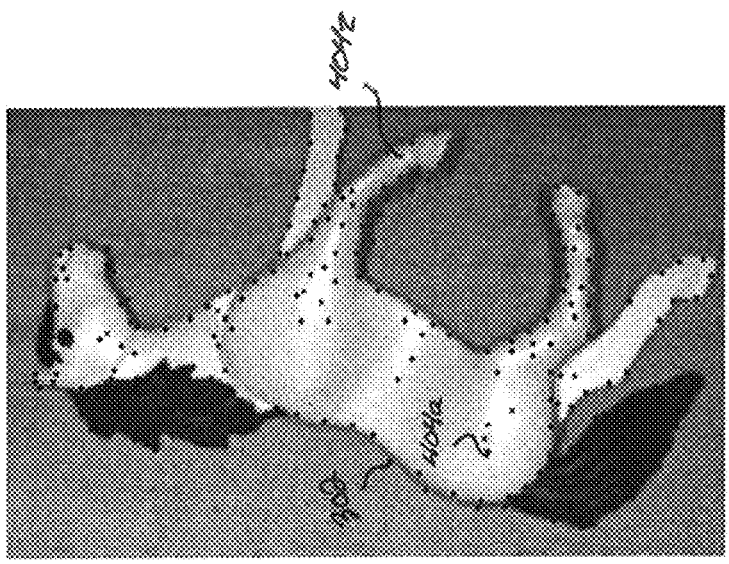
FIGS. 4A and 4B are illustrations of the template item of FIG. 3 showing (i) model template contours defined by contour edges and (ii) model template base points derived from the model template contour edges, respectively, of the item.
Figure 4A:
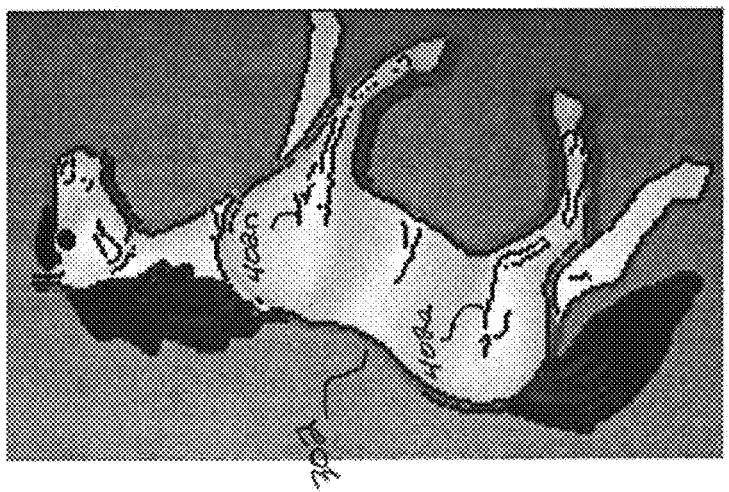
Figure 3:
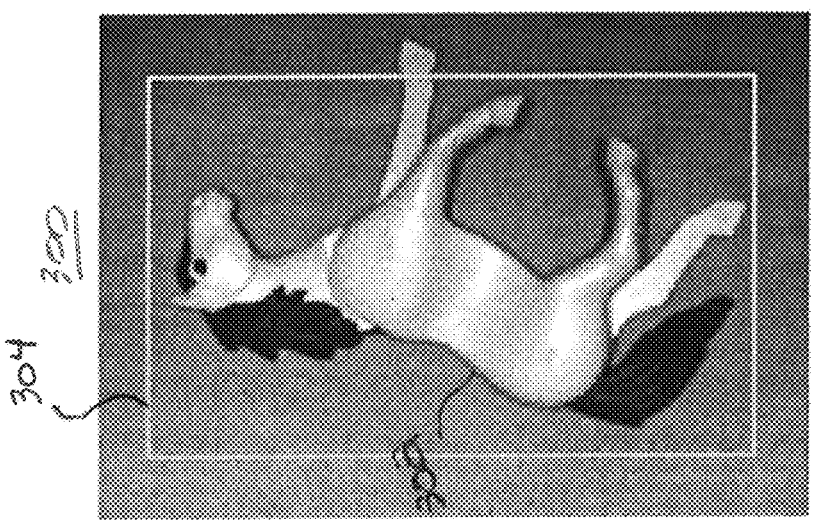
FIG. 3 is an illustration of an illustrative template image of an illustrative template item or object to be modeled for later identifying the template item during computer vision applications.

With regard to FIGS. 4A and 4B, illustrations of the template item 302 of FIG. 3 showing (i) model template contours defined by contour edges 402a-402n (collectively 402) and (ii) model base points 404a-404z (collectively "base points" 404) derived from the model template contour edges 402, respectively, of the item 302 are shown. The contour edges 402 may be defined using a variety of contour extraction and edge defining algorithms, as further described herein.

Figure 4C:
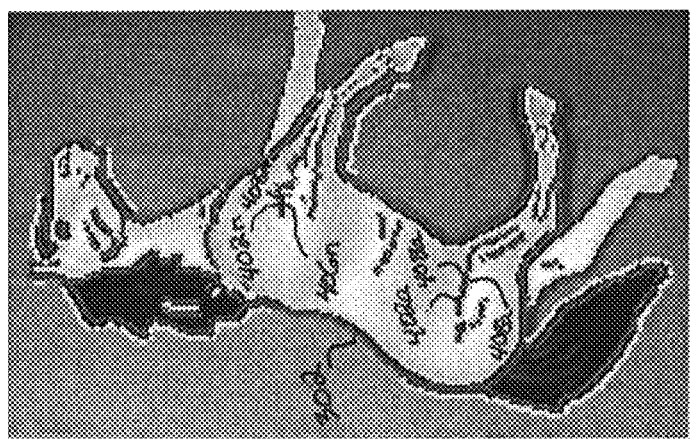
FIGS. 4C and 4D are illustrations of the item with template model template contours and model base points, respectively, being extended to include the results of processing multiple shape layers, in this case three layers.
Figure 4D:
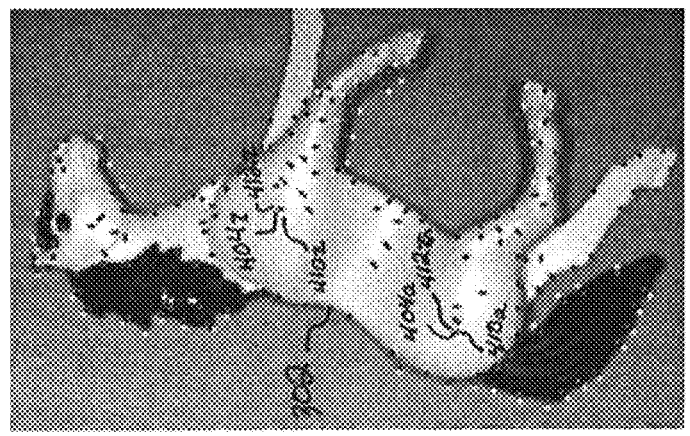
Figure 4E:
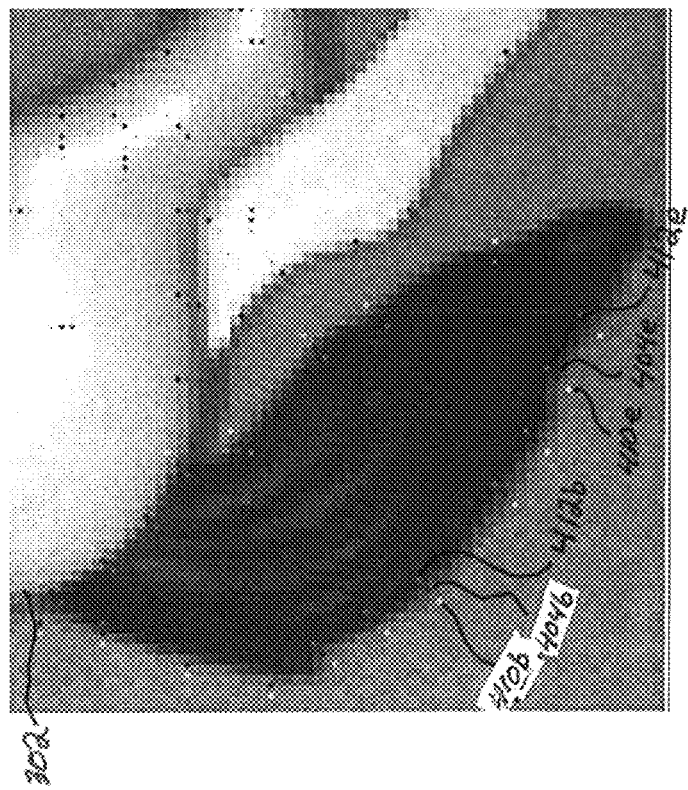
FIG. 4E is an illustration of a close-up of a portion of the template item with multilayer model base points.

With regard to FIGS. 4C and 4D, illustrations of the item 302 with template model contours and model base points, respectively, being extended to include the results of processing multiple shape layers are shown. Model template multilayer contour edges 402, 406a-406n (collectively 406), and 408a-408n (collectively 408) are shown in FIG. 4C, and model template multilayer base points 404, 410a-410z (collectively 410), and 412a-412z (collectively 412) are shown in FIG. 4D. The multilayer base points 404, 410, and 412 may be defined as "base point sets," and are derived from respective contour edges 402, 406, and 408 of FIG. 4C. In an embodiment, the multilayer base points 410 and 412 may be positioned on different sides of the model template base points 404 and along a gradient vector determined at the respective base points 404.

Traditionally, for contour-based template matching, model points used in the search/runtime phase are basically a subset of model contours selected by following a criteria. The criteria may be defined, for example, by (i) subsampling the points by taking a contour point every Nth point, (ii) selecting strongest gradient module points, and (iii) other selection criteria. The model template process may be extended by selecting strongest gradient module points for each of the multi-layer base point in the base point sets. That is, the strongest gradient of each of the multilayer base points (e.g., each of the base points 404a, 410a, and 412a in the base point set) may be selected and used as base points (see FIG. 5B, for example) during run-time to speed up processing. The strongest gradients associated with the selected base points are stored for comparison purposes during run-time.

With regard to FIG. 4E, an illustration of a close-up of a portion of the template item 302 of FIG. 3 with the multi-layer model template base points 404, 410, and 412 that were derived from the multilayer contour edges 402, 406, and 408 of FIG. 4C is shown. Illustrative base points 404b and 404e are initially generated as model template base points, as shown in FIG. 4B, and then the model is extended to add the multilayer base points 410b and 412b, 410e and 412e on either side of the base points 404b and 404e along a gradient of the base points 404b and 404e, thereby creating flexibility in the model by creating a band. The multilayer base points 410 and 412 may be selected based on gradients at the base points 404 to generate an envelope (see, for example, FIG. 2) in which edges of a deformable item may be deformed. It should be understood that the base points 404 may be considered a base layer of the multilayer base points.

Figure 5B:
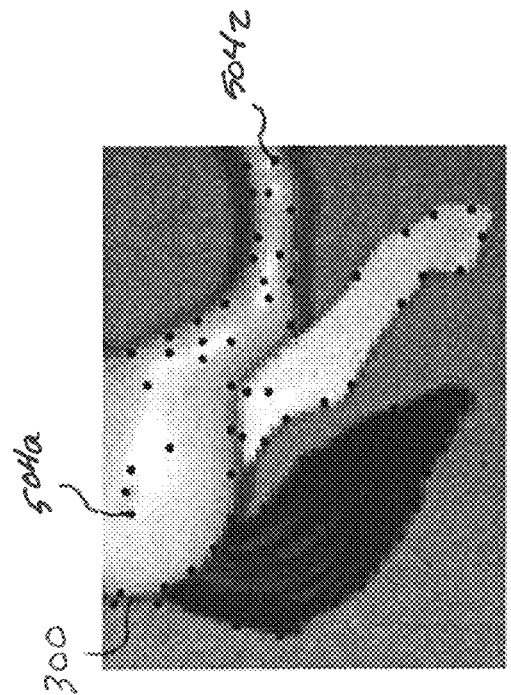
FIGS. 5A and 5B are illustrations of close-ups of the template item of FIG. 3 showing contour edges of a full contour model and base model points that are used at run-time.
Figure 5A:
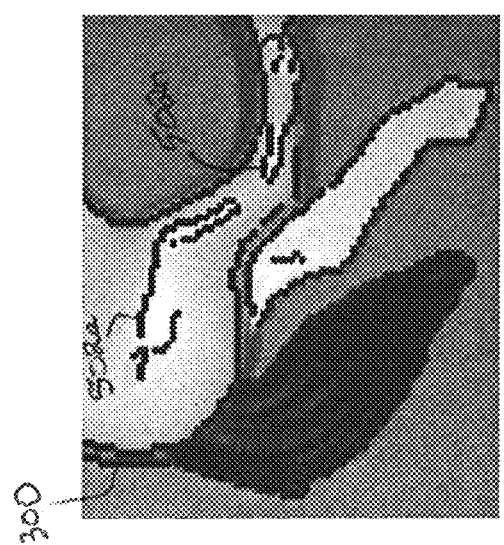
Figure 8:
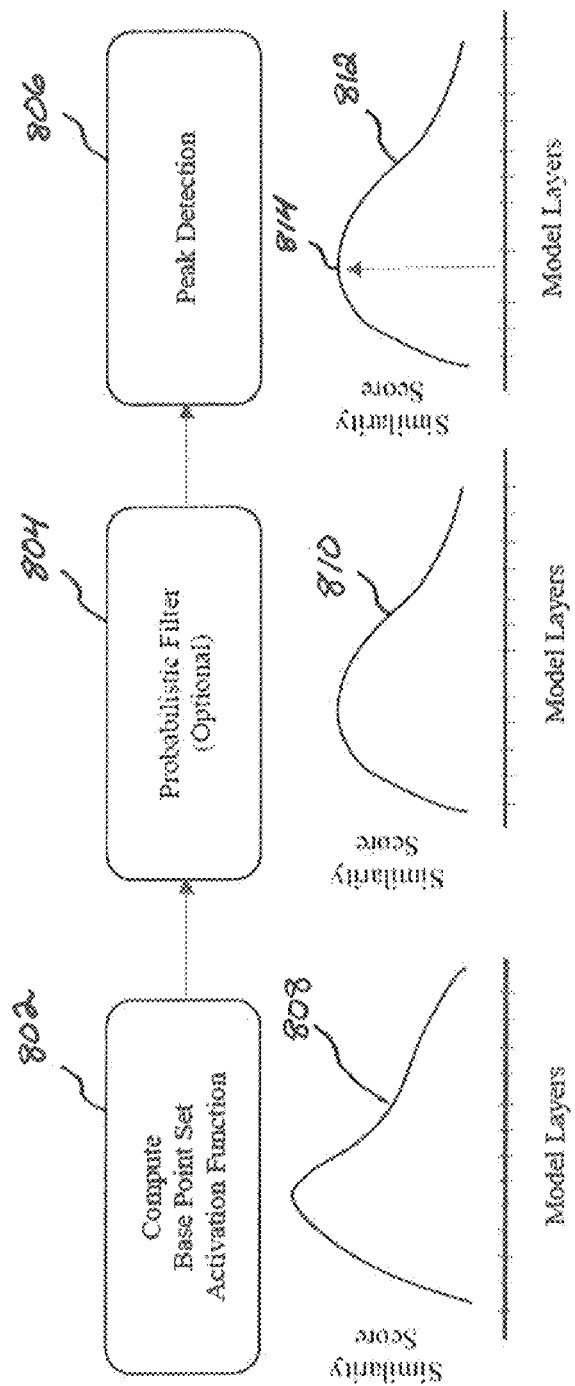
FIG. 8 is a flow diagram of a runtime phase process for determining a max contour of each of the model base points of model base points sets.

With regard to FIGS. 5A and 5B, illustrations of close-ups of portions of the template item 300 of FIG. 3 showing contour edges 502a-502n (collectively 502) of a full contour model and base model points 504a-504z (collectively 504) that are used at run-time are shown. In addition to the full contours that produce the contour edges 502, the base model points or "probes" 504 that are actually used in a similarity score matching phase, further described with regard to FIG. 8, are selected from corresponding points from base point sets (see, for example, base points 404, 410, 412 of FIG. 4E that form respective base point sets). The single points 504 at each of the point locations along the contour 502 results (i.e., a single base contour for each level of a pyramid). Each of the single points 504 along the base contour can be used to construct the additional contour layers having associated base point sets, as described with regard to FIGS. 16 and 17.

Terminology definitions may be, as follows:

Base points: base points are points extracted from an original base contour, where each base point is characterized by certain features, such as a gradient associated with a base point.

Base points set: for each base point, a base point set is generated by creating an extended base contour (i.e., a contour composed by multiple layers (see FIGS. 4C and 4D). The term layers is used when referring to contours.

Figure 16:
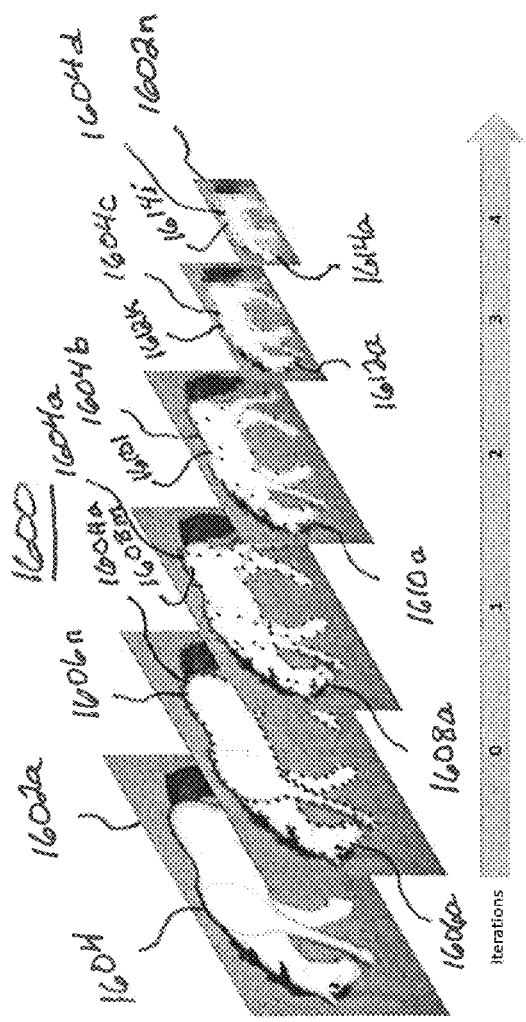
FIG. 16 is an illustration of a set of images inclusive over multiple iterations of a template object to generate model points.
Figure 17:
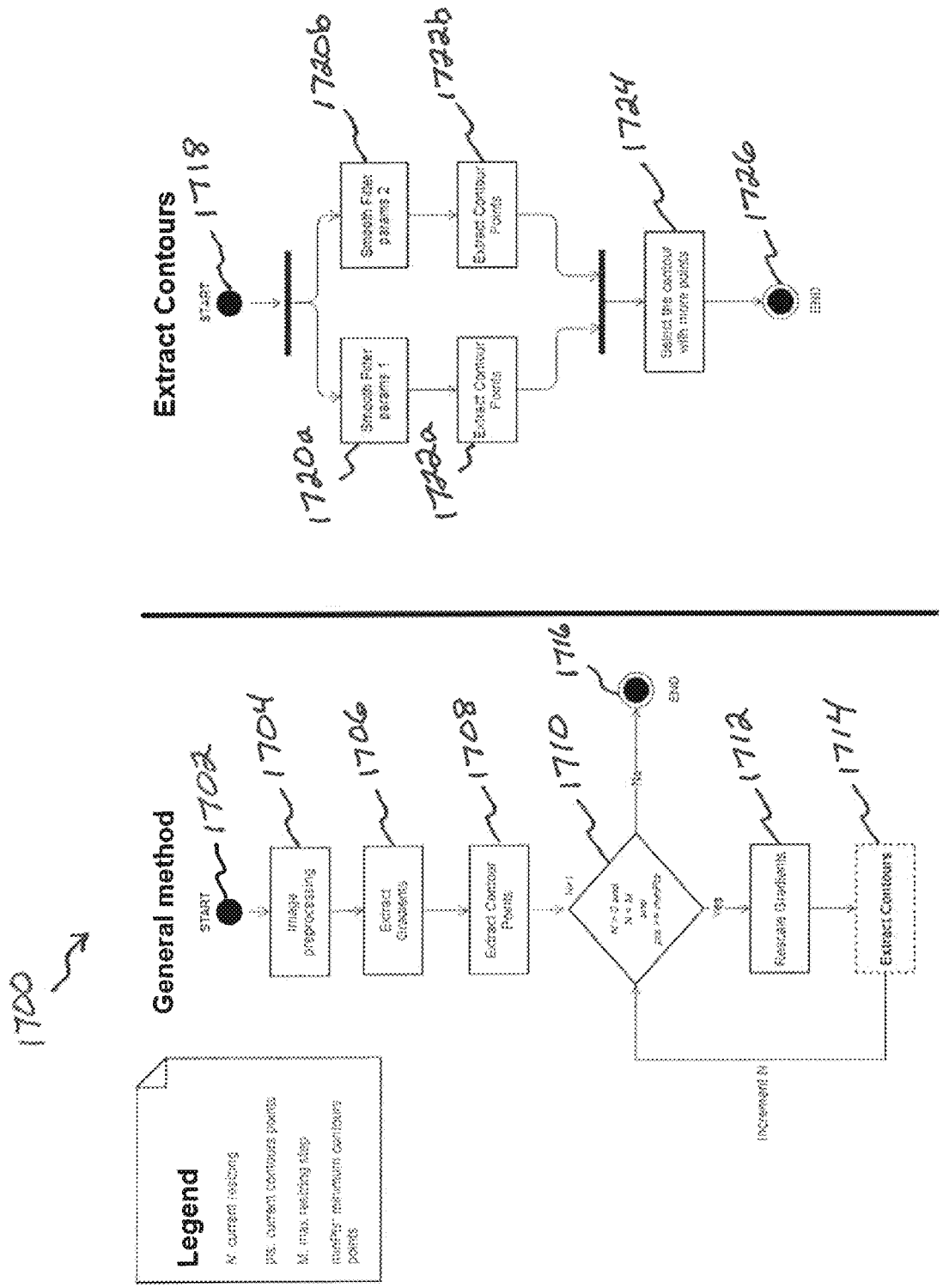
FIG. 17 is a flow diagram of an illustrative process for generating base model points and associated gradients and contours.

A pyramid is composed of several levels, where each level is associated with a different image resolution (see FIG. 16, for example). With conventional pyramids, each level is generated by sampling the full image, so the pyramid is considered a multilevel-image pyramid. In FIGS. 16 and 17, however, the pyramid is shown to be a multilevel-features pyramid, as opposed to a multilevel-image pyramid, in accordance with the principles described herein.

Figure 6:
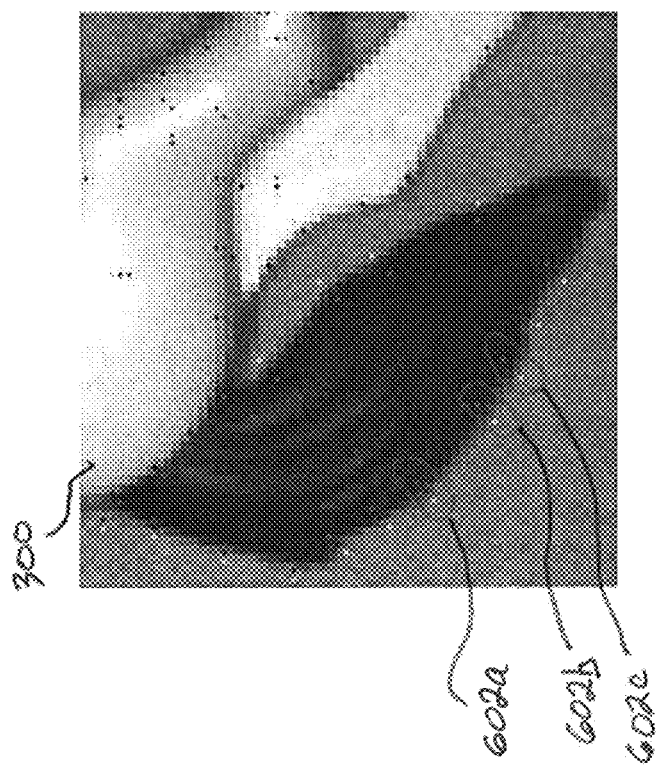
FIG. 6 is an illustration the item of FIG. 3 with model "base point sets" for some original model points.

With regard to FIG. 6, an illustration of a close up of the item 300 of FIG. 3 with model base points sets 602a, 602b, and 602c (collectively 602) for some original model points is shown. When extending the model by adding multiple contours layers, every single base model point used at runtime (see FIG. 5B) is not used alone, but rather each model base point is used in conjunction with corresponding points/probes found on other contour layers. The number of contour layers may be 3, 5, 7 or more depending on how many layers are added to the original model points to form "model base point sets." The three base-point sets 602 are composed of three base points each. It should be understood that if a different number of contour layers (e.g., 5 or 7 contour layers) were to be used, that the number of model base points in each of the base point sets 602 would match the number of contour layers.

Figure 7:
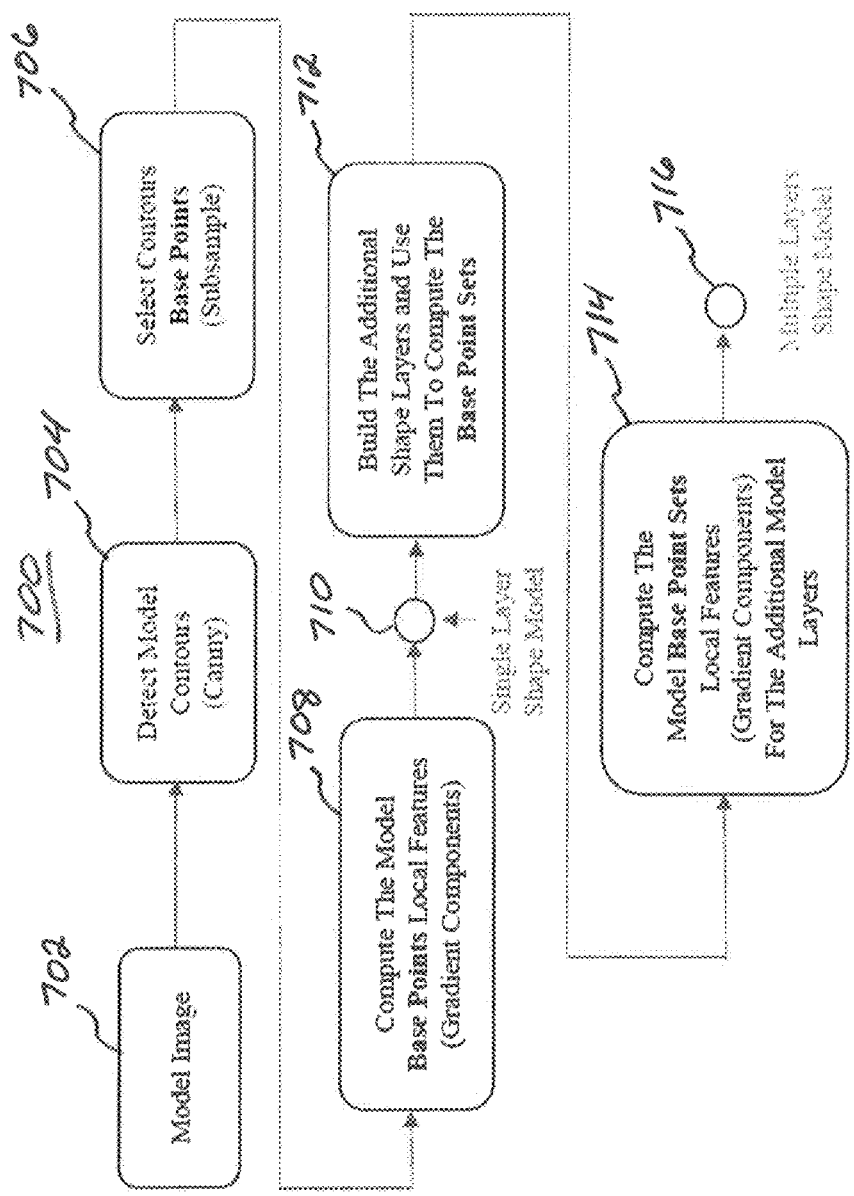
FIG. 7 is a flow diagram of a process for a training phase for determining model base points sets for multiple layers of a shape model.

With regard to FIG. 7, a flow diagram of an illustrative process 700 for executing a training phase for determining model base points sets for multiple layers of a shape model is shown. The process 700 may start at step 702, where a model image is received. The model image may be an image of a template item, such as that shown in FIG. 3. At step 704, the process 700 may detect contours on the model utilizing an edge detection model. In an embodiment, a Canny edge detection algorithm, as understood in the art, may be utilized. Other edge detection algorithms may alternatively be utilized. The edge detection algorithm, whichever is used, may be configured to generate data representative of contours, gradients, and edges. Each of the edge points may have associated gradient data.

At step 706, contours and base points may be selected from the contours so as to form a subsample of edges of the contours. The subsamples may be determined in a variety of ways, such as identifying maximum or peak local contours or gradients, selecting a certain number of base points or distance between base points over a certain distance, or otherwise. At step 708, model base points of local features may be computed. In computing the model base points, gradient components may be associated with each of the base points. In other words, each subsampled base point along an edge that defines a contour is to have a gradient vector (i.e., gradient magnitude and direction) associated therewith further use during runtime comparisons. At step 710, a single layer conventional shape model is completed.

At step 712, to extend the image model, additional shape or contour layers may be built. The additional shape layers may be used to compute the base point sets (e.g., 3, 5, or 7 base points per base point set). That is, each layer will have a different set of base points, and the base points of the different layers that are associated with one another along the edges of the contours form a base point set (see, for example, FIG. 6, model base point sets 602a, 602b, 602c having three corresponding base points in each base point set). At step 714, local features for each of the base point sets may be computed to create model base point sets from each of the base points of the additional layers along with associated gradients. As previously described, the model base point sets, as opposed to the base point sets, include the gradients computed at each of the corresponding base points. Output from step 714 is a multiple layer shape model, which includes each of the model base point sets and corresponding gradient data.

Runtime Phase

The runtime phase may use a sliding window approach, thereby leveraging a pyramid framework to speed up processing time. The pyramid framework may be performed by creating model base point sets from an imaged template object at different downsampled amounts during the training phase and then performing a coarse resolution search to a fine resolution search a search image. In an embodiment, the sliding window approach may use a set of processing pipeline steps employed to compute a deformation aware similarity metric. For every point belonging to a "base point set," the similarity metric may be computed, which basically means that a score value is computed for every model layer and these scores together may be represented as a score curve that can be filtered and used to detect the model layer locally corresponding to the best/max score value in the "base point set" (see FIGS. 5A and 5B, for example).

In summary, the contours points selected are used together with their related features to:

(i) in the model building phase: generate the base point sets (extended contours layers); and (ii) in the search phase: manage rotation and scale of the image model to manage a range of rotations and scales of all the model points (and in all pyramid levels) to locate any of the modeled template objects in a search image.

Note. It should be understood that during the search phase, a search image pyramid is created. Thereafter, for each search image pyramid level, starting from the coarsest level, the search image is searched using a model build from the same level of the gradient image. For example, if five models are extracted from five levels of a gradient image pyramid, five levels of a search image pyramid (with subsequent resolution reductions) are also built. During the search, the model extracted from gradient image level five is searched (i.e., search the captured image at level five using the position, rotation, scale of the image model) into the search image level five. If a match is identified, then confirmations of the match of the image model are performed in levels four, three, two, and one of the gradient image into levels four, three, two, and one of the search image (i.e., captured image being searched for the template object using the image model). The search is actually performed using the gradients associated with the template model points to locate similar gradients within the search image at each of the respective pyramid levels.

With regard to FIG. 8, a flow diagram of a runtime phase process 800 for determining a max contour of each of the model base points of base point sets is shown. The process 800 may include processes to compute (i) a base point set activation function at step 802, (ii) probabilistic filter at step 804, which may be optional, and (iii) peak detection function at step 806. Given a multilayer model, for every point position in the "base point sets," a similarity score (e.g. a dot product) may be computed, thereby generating an activation curve or score curve 808 that describes how similarity scores vary moving across different model layers. The score curve 808 may be filtered through the optional probabilistic filter 804, which may have multiple purposes such as: (i) apply a different weight to different layers to give more or less relevance to an external layer, and (ii) performance outliers rejection by smoothing the score curve 808 to produce a filtered score curve 810. A peak detection function 806 may be configured to determine a peak 812 of the score curve 808 so as to identify a best matching layer 814 for each of the base point sets.

Figure 9:
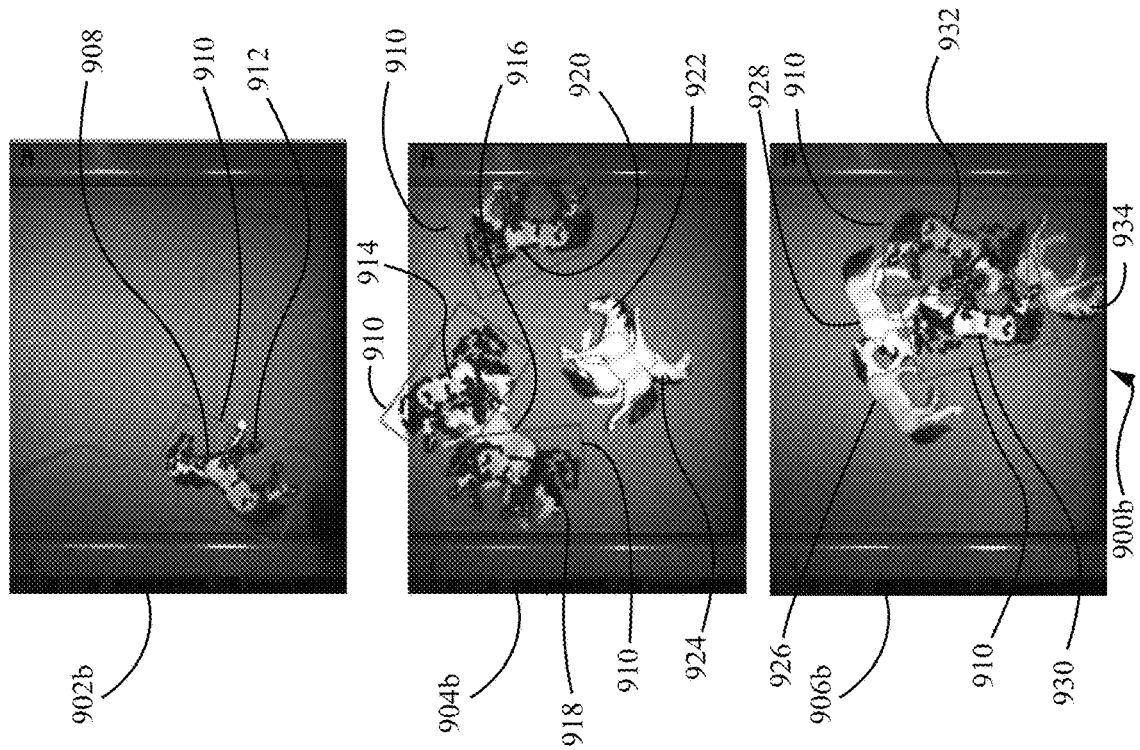
Figure 9:
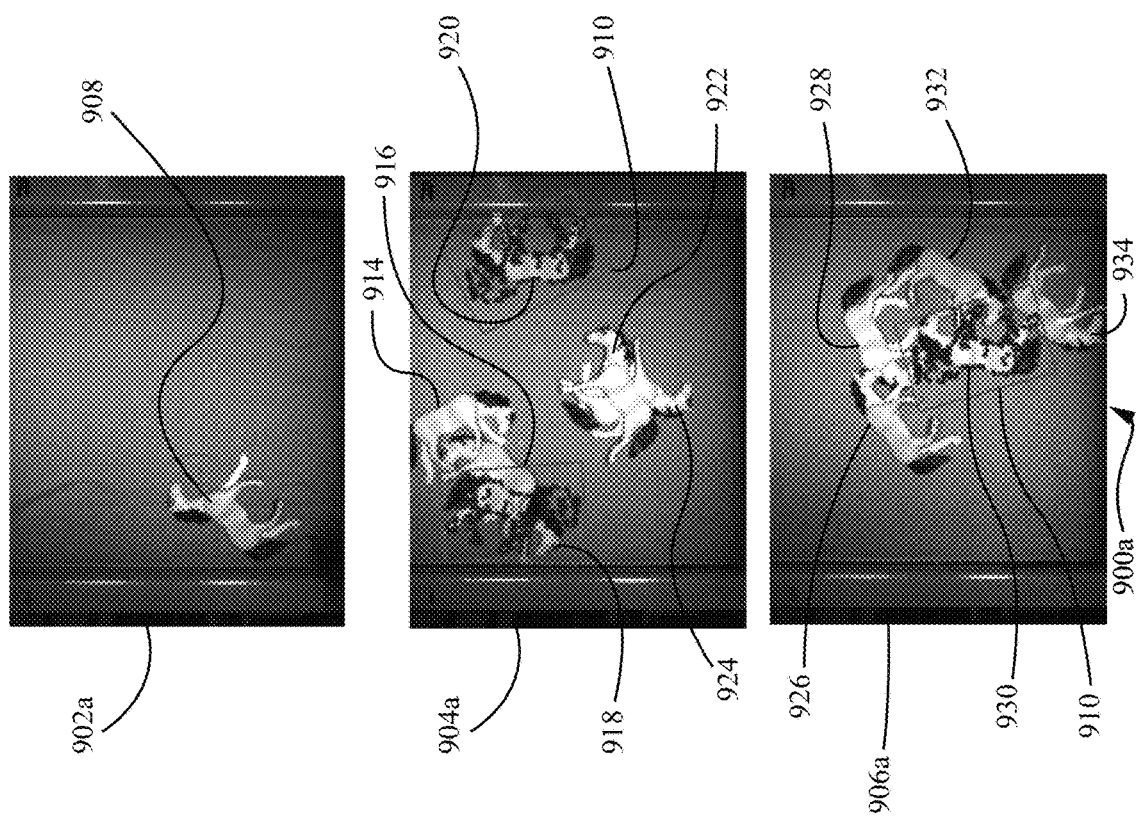

With regard to FIG. 9, a set of illustrations of pair of sets of images 900a and 900b that show a comparison of identifying items in the same images (e.g., 902a and 902b) with deformation management turned OFF and deformation management turned ON are shown. Image set 900a includes images 902a, 904a, and 906a, and image set 900b includes images 902b, 904b, and 906b. To validate functionality of the approach described herein, more items should be identified in the set of images 900b than 900a as deformation management using the extended template model training process is applied to the images 900b and not images 900a. As previously described, deformation management robustly extends detection capabilities of a traditional contours-based template matching approach. A traditional template matching approach was used for identifying a template object in image set 900a, and the template matching with deformation management was used for image set 900b.

In particular, images 902a and 902b each include template object 908. With the deformation management in the OFF state, a traditional template matching approach uses a single contour layer to compute model base points with gradient components (see FIG. 7, steps 702-710) to template match the object 908. With the deformation management in an ON state, a deformation matching technique extends the model base points to include multiple shape layers by computing additional base points from the different contour layers so that each model base point generated from the single base contour layer is a member of a corresponding base points set to ultimately produce model base points derived therefrom. As shown in image 902a, the object 908 is not identified or matched when performing a template match during runtime, but the object 908 is identified when performing the template match with the deformation management being in an ON state in image 902b. As shown in image 902b, a window frame 910 is shown to be around the identified object 908 and model base points 912 are aligned with the object 908.

During runtime, the window frame 910 may be traversed along the image using a scan pattern (e.g., left to right, drop, right to left) or random access based on a variety of image processing techniques. Once the window frame 910 is located at a position where an object is potentially positioned, the model base points 912 may be rotated and/or scaled so as to compare the gradients associated with the model base points 912 with corresponding gradients of the search image. Because of the extended algorithm that uses additional shape layers to compute multilayer base point sets, model base points 912 that are within a band (see, for example, band 202) may be used in performing the template matching during runtime.

As shown, and in operation during runtime, object 908 is not identified in the image 902a, while object 908 is identified in image 902b. In image 904a, objects 914, 916, 918, 920, 922, and 924 are shown with two objects 916 and 920 being template matched. In image 904b, however, by turning the deformation management ON (i.e., adding the additional contour layers during the training phase to expand the band of the edges of the object being modeled, as previously described), three objects 914, 916, and 920 are matched. Similarly, in image 906a, objects 926, 928, 930, 932, and 934 are shown with only one object 930 being template matched, while in image 906b, two objects 930 and 932 are shown to be template matched. As such, by expanding the edges to define a band that a non-rigid template object may range in deformed states, the template matching is more accurate when identifying objects within search images.

With regard to FIG. 10, an illustration of an illustrative deformable object 1000 in which base model points 1002a-1002n (collectively 1002) are disposed on and off the deformable object 1000 is shown. A subset 1002b-1002m of the base model points 1002 that were modeled from a template object (not shown) are shown where a head of the model object was positioned at the time of modeling to generate the base model points 1002. The remainder of the base model points 1002 are shown to be aligned with the object 1000 such that it may be statistically possible to determine that the object 1000 matches the template object despite a portion of the objects not being matched by the image model.

Figure 22:
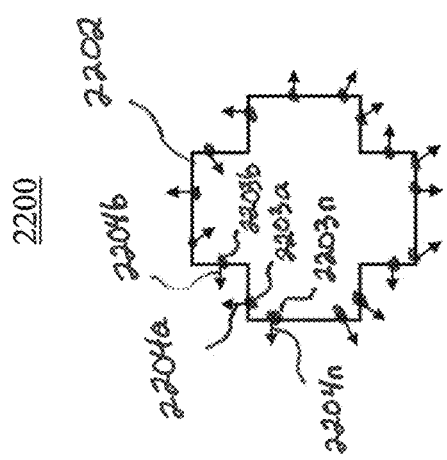
FIG. 22 is an illustration of an illustrative template model of a template object.

With regard to FIG. 22, an illustration of an illustrative template model 2200 of a template object 2202 is shown. Model points 2203a-2203n (collectively 2203) may be determined at the edges or other contours of the template object 2202. Gradients 2204a-2204n (collectively 2204) may be determined at the model points 2203, where the gradients identify the direction and magnitude of the contours at the model points, as previously described. The gradients 2204 are used in performing a template matching process in a search image.

Figure 23:
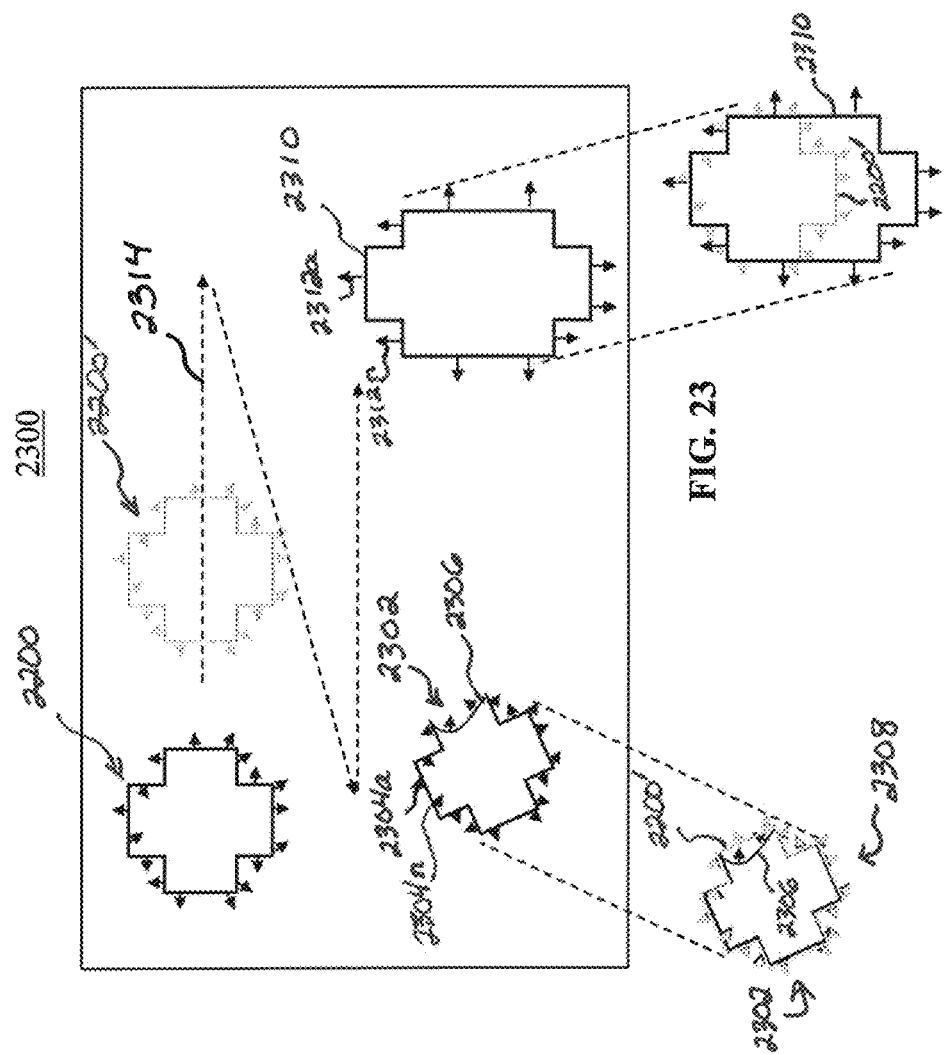
FIG. 23 is an illustration of an illustrative captured or search image in which the template model of FIG. 22 may be used to identify the same or similar objects as the template object.

With regard to FIG. 23, an illustration of an illustrative captured or search image 2300 in which the template model 2200 of FIG. 22 may be used to identify the same or similar objects as the template object 2202 is shown. The template model 2200 may start at a location of the search image 2300 and be used to scan the search image 2300 in any number of patterns. As previously described, the template model 2200 may be scanned, as shown by template model 2200', in location, rotation, and size. In an embodiment, a pyramid search may be performed, as previously described and as described further herein.

A first object 2302 that has a similar shape as the template object 2202 is shown. Gradients 2304a-2304n (collectively 2304) are positioned around the edges of the object 2302. One of the regions of the object 2302 is shown to have a different shape, in this case a concave curve along an edge, as compared to the template object 2202 that has a straight corresponding edge. An overlay 2308 of the template model 2200' on the object 2302 that occurs as the template model 2202' is aligned with the object 2302. In performing the alignment and comparison, the gradients 2204 and 2304 are actually aligned so that a comparison may be performed, as described with regard to FIG. 8. In this case, despite the edge 2306 of the object 2302 and template object 2202 not matching, a sufficient amount of the remainder of the gradients align with one another such that a probability of the template object 2202 and object 2302 may be high enough (e.g., above a threshold) to determine that a match exists.

As further shown, another object 2310 with gradients 2312 is captured in the search image 2300. Although certain aspects of the template object 2202 and object 2310 are matched, as provided by an alignment of certain gradients, the shapes are shown not to be matched due to gradients not being aligned and the shapes having a significant different around the entirety of the image model 2200'. The template model 2200' may follow an illustrative path 2314 that is scanned across and down the search image 2300. It should be understood that any search pattern may be utilized. It should also be understood that a coarse level of a pyramid of the template model 2200' may be used to locate a potential match in the template image 2300 (with the resolution of the template image 2300 matching the resolution of the course level of the template model 2200'), and then lower levels of the pyramid of the template image 2200' may be compared to the potential match, as described further herein.

Pattern Matching Acceleration Through Multiscale Features Representation

In computer vision, there are different historical approaches to template matching.

A common approach is to use a multilevel image representation (most commonly named Image Pyramids): this includes a recursive resizing that starts from the original template image, and for each resize level, compute the gradients directions and the probes for the model.

In general, template matching is a technique for finding areas of an image that match (or are similar to) a template image that include two images. A general approach, as previously described, utilizes two common phases:

Training Phase: Extract features from a template image used for detecting the template image within another image.

Searching or Runtime Phase: Use the features extracted in the training phase and match the features of the template image in the image being searched for inclusion of the template image.

In an industrial context, it is very difficult to describe generic template features. Usually the use of gradient directions represent the best techniques to extract features of industrial parts. However, the extracted features are not always scale and rotation invariant.

Figure 11:
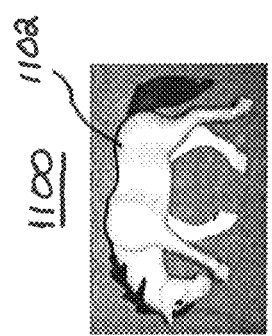
FIG. 11 is an image of an illustrative template object for use in template matching.

With regard to FIG. 11, an image 1100 of an illustrative template object 1102 for use in template matching is shown. During a training phase, features, such as contours, edges, and gradients, may be determined and a mathematical model including model points that describe the template object 1102 may be generated for use during the searching or routine phase to identify the template object in images, such as shown in FIGS. 12A and 12B.

Figure 12A:
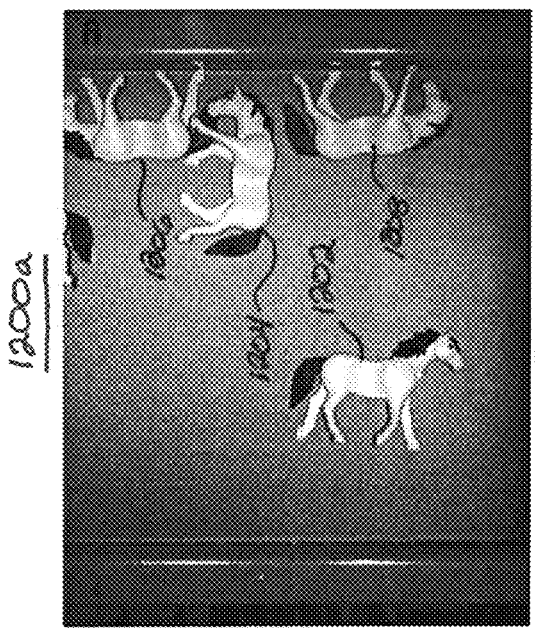
FIGS. 12A and 12B are images inclusive of objects to be template matched using the imaged template object of FIG. 11.
Figure 12B:
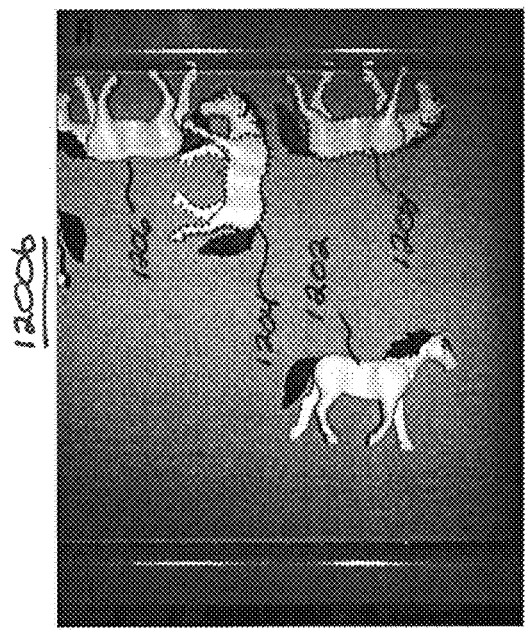

With regard to FIGS. 12A and 12B, images 1200a and 1200b inclusive of objects 1202-1208 to be template matched using the imaged template object 1102 of FIG. 11 are shown. In this case, objects 1204 and 1208 are determined to match the template object 1102. As provided above, the gradient directions that represent the template object 1102 may be used during the searching phase, where the template is translated, rotated, and scaled across the image 1200*a* to identify any of the objects 1202-1208 that match the template object 1102.

One of the challenges with template matching is the time and processing power needed for performing the matching during runtime. To reduce time and processing power, pattern matching acceleration through a multiscale features representation approach during the template matching training phase may be utilized. The processes described hereinbelow use a multiscale features representation based on gradient images, as provided in FIG. 17. A template model may be defined as a series of model points described by position in the image along with values of associated gradients. The model points are located along the edges of the images. It should be understood that the multiscale process described hereinbelow may be an alternative embodiment to the extended template matching process inclusive of additional contour layers, as previously described.

First, the naïve approach is a basic method that transforms a template image into a template model using the following phases:

Extract gradients: compute directions of gradients from a template image using Sobel operator, for example.

Extract edges: extract edges using Canny techniques, for example.

Extract points: determine all or subset of edge points.

Figure 13:
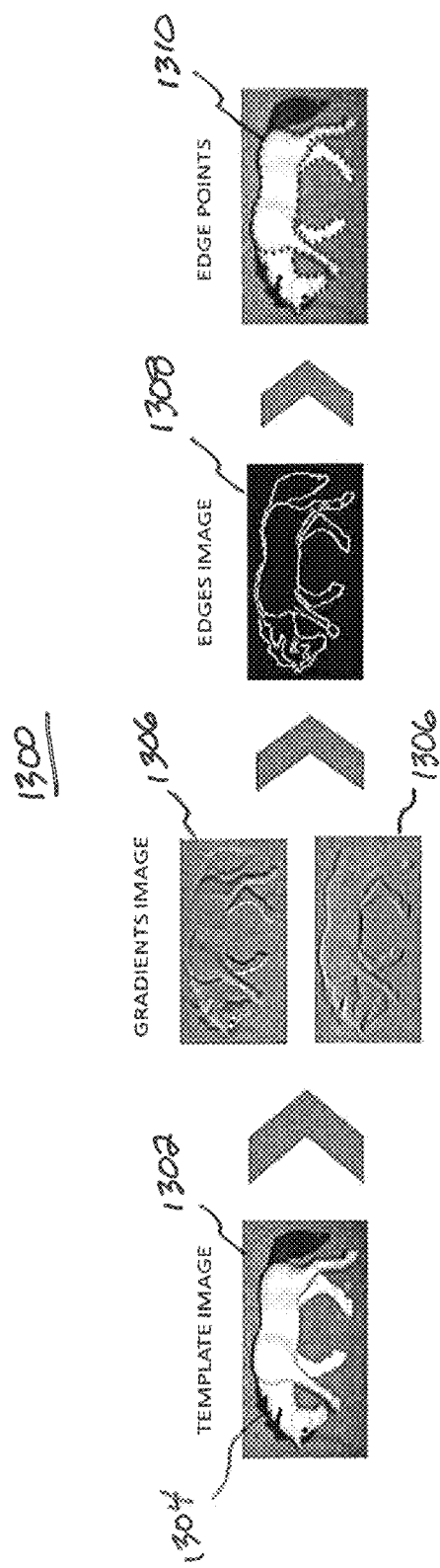
FIG. 13 is an illustration of a naïve process for a training phase of a template matching process to identify edge points or base points.

With regard to FIG. 13, an illustration of a naïve process for a training phase of a template matching process 1300 to identify edge points or base points is shown. The process 1300 may include providing a template image 1302 of an object 1304. Gradients image 1306 may be determined and an edges image 1308 may be generated. Edge points 1310 may thereafter be determined, where the edge points 1310 are a subset of the edge points along the edges from the image 1308.

Figure 14:
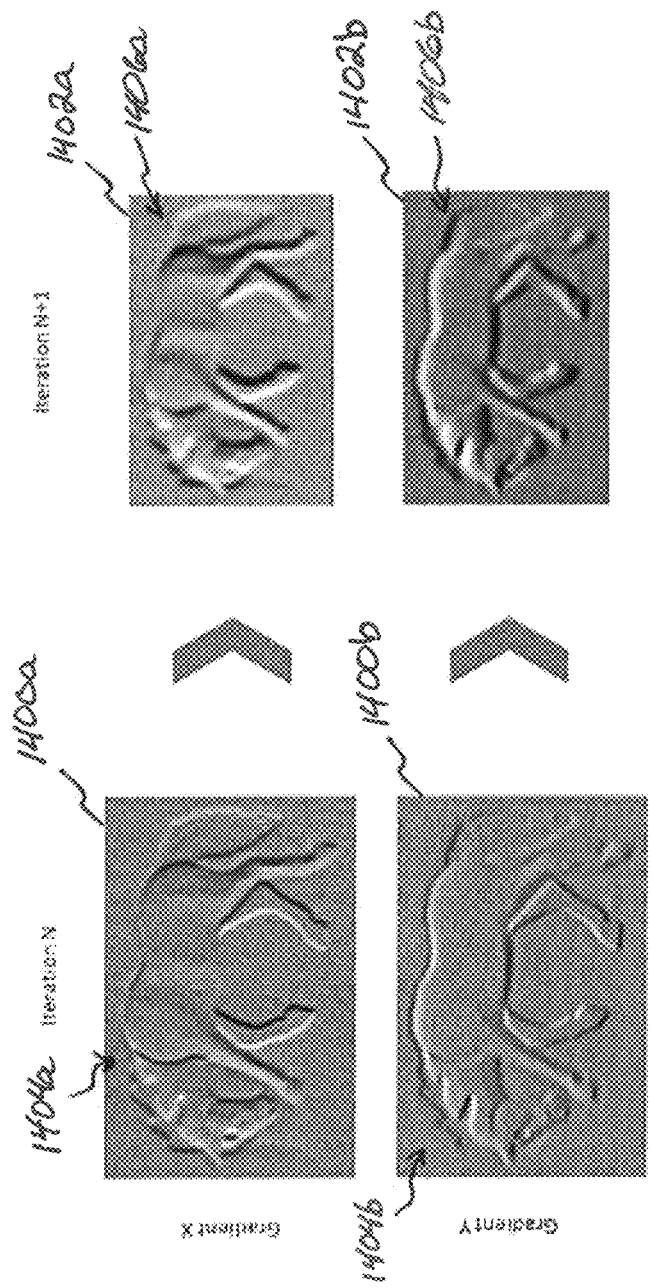
FIG. 14 shows illustrative gradient images over multiple iterations.

The naïve technique is very slow, but is very accurate. However, if the image is resized, as provided in FIG. 14, the algorithm performs very well in terms of performance, but has a poor accuracy. In order to improve both performance and accuracy, a tradeoff is presented by the multiscale features representation approach. The multiscale features representation approach is an iterative process that computes gradients from full resolution images and build a sequence of gradients resolutions. Each iteration may be described with the following steps:

Step (i), Resize the gradients: Resize gradients images. As shown in FIG. 14, illustrative gradient images 1400*a* and 1400*b* (collectively 1400) in multiple iterations are shown. Gradient image 1400*a* is a gradient X image, and gradient image 1400*b* is a gradient Y image (i.e., gradients in the X and Y directions, respectively). Gradient images 1402*a* and 1402*b* at iteration N+1 are shown, where the gradient images 1402*a* and 1402*b* (collectively 1402) are shown to be smaller and blurrier. In general, the gradient images 1402*a* and 1402*b* are provided to shown the results of rescaled, smoothed gradient images. The iterative resizing may be performed over multiple iterations, as described below.

Step (ii), Gaussian Blur: When the gradient images are rescaled, noise may be removed from the rescaling process by adding a Gaussian blur to the gradient image. For example, two different sigma values for a Gaussian blur may be computed from the resized gradients images. In an embodiment, for params 1, sigma may be set to a first value, and for params 2, sigma may be set to a second value different from the first value. Other smoothing functions may alternatively be utilized.

Figure 15B:
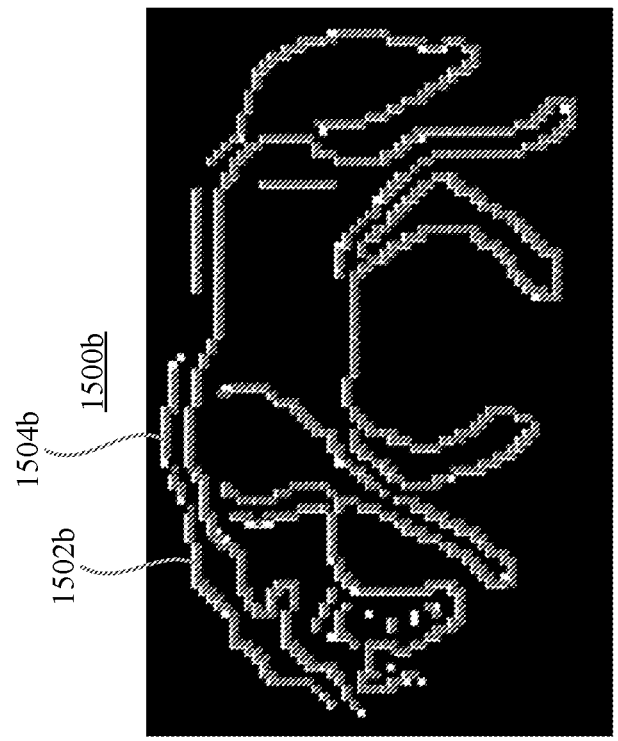
FIGS. 15A and 15B are illustrative images that show edges identified using the Canny edge detection algorithm of the template object with params 1 and params 2.
Figure 15A:
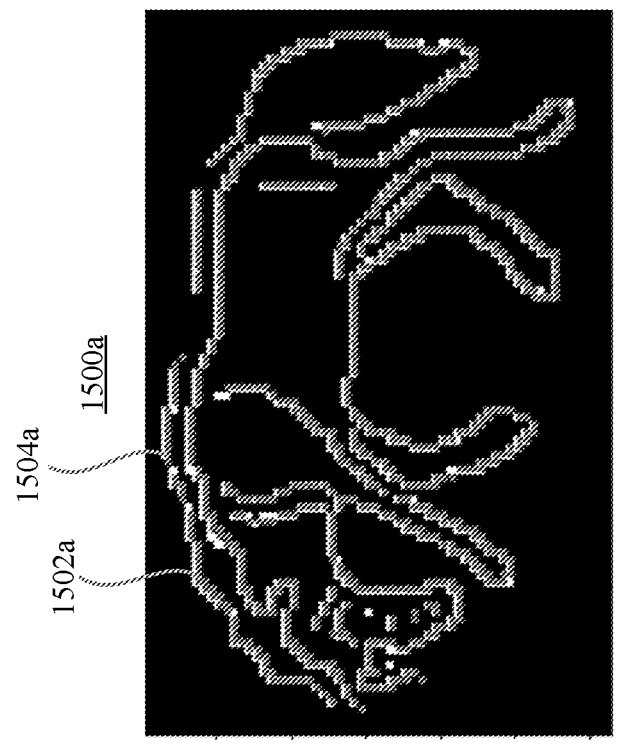

As shown in FIGS. 15A and 15B, illustrative images 1500*a* and 1500*b* with edges identified using an edge detection algorithm (e.g., Canny edge detection algorithm) of the template object with params 1 and params 2 are shown. As further described with regard to FIG. 17, extract contours points generates contours identified in white 1504*a* and 1504*b* and then extracts model points represented in gray 1502*a* and 1502*b*.

Step (iii), Extract points: Points may be extracted at each iteration. Both model points and contour points may be extracted using an edge detection algorithm, such as the Canny algorithm. Other edge detection algorithms may alternatively be utilized.

Step (iv), Select the best edge points: FIGS. 15A and 15B represent a generic iteration N. The difference between FIGS. 15A and 15B is a smooth filter parameter applied to a gradients image. Each process with different filter param could generate different contour points: in this case FIG. 15A is generated by the process with smooth param 1 and FIG. 15B is generated by the process with smooth param 2. A criteria to select the best edge point is a number of points each gradient image includes (see FIG. 17 and associated description).

With regard to FIG. 16, an illustration of a set of rescaled gradient images 1600 based on an initial template image 1602*a* of a template object 1604 is shown. The initial template image 1602*a* of the template object 1604 is not changed in size, but gradients images are rescaled. A template object 1604*a* is shown with model points 1606*a*-1606*n* that are determined by an edge detection algorithm and associated with gradients. The template objects 1604*b*-1604*d* are shown to be reduced in size in each of the iterations 2, 3, and 4, and the corresponding model points 1608*a*-1608*m*, 1610*a*-1610*l*, 1612*a*-1612*k*, and 1614*a*-1614*i* are reduced when rescaling the gradients images, such that a point (X,Y) in each N+1 rescaled gradient image corresponds to an area of points in the N rescaled gradient image.

With regard to FIG. 17, a flow diagram of an illustrative process 1700 for generating base model points and associated gradients and contours is shown. The process 1700 may start at step 1702, where an image of a template object is received for the processing pipeline. At step 1704, image preprocessing of a template image of a template object may be performed. The image preprocessing may include removing image noise from the template image. At step 1706, gradients may be extracted from the preprocessed image of the template image of the object. In an embodiment, gradients may be extracted from a proposed pre-processed template image using a gradient extractor operator, such as Sobel. The extracted gradients of the image may be vector features, and described by two main X and Y components. Both Gx and Gy may be computed as gradient images.

At step 1708, contour points may be extracted. Using the gradients image extracted at step 1706, gradients edges may be extracted using an edge detection algorithm, such as Canny, that extracts contours of the image. Model points are also extracted from the generated contours by selecting appropriate edge points (e.g., all edges points or a subset of edge points may be selected depending on the number of edge points). It should be understood that contours are chains of edges, and each edge point of the chain may be selected as a model point.

A conditional block 1710 may be used to determine if it is possible to create new template model level. At step 1710, a determination may be made by determining if a number of model points is enough to continue to build another model level. A current resizing variable N represents a number of iterations and also the number of multiscale levels. Prior to starting the loop, the current resizing variable N may be set to a value of 1, for example.

More specifically, at step 1710, a determination may be made as to whether the current resizing value N is greater than or equal to zero (i.e., not negative) and a number of model points is greater than or equal to a minimum number of model points. When either of the conditions at step 1710 fails, the process of producing a set of rescaled gradient images used to generate a set of contour or model points stops. As the process 1700 loops back to step 1710, the current resizing value N may be incremented by 1.

In general, an iterative process may be performed and include an input and output, where the input of each of the iterations are the gradients images, and the gradients images may be used, as follows:

First pass: the iterative process (of the loop) may use the gradients images computed on the original image resolution. For each successive pass, the iterative process uses the gradients images computed by rescaling the gradients images of the previous level produced by the previous pass, whereby the original image is never rescaled as is a traditional pyramid approach. If the conditional block 1710 is not satisfied, then the process exits from the build model processing pipeline process 1700.

More particularly, at step 1712, rescaled gradients for the gradient images may be computed. In rescaling the gradients images, a point (X,Y) in each N+1 rescaled gradient image corresponds to an area of points in the N resealed gradient image. At step 1714, contours of the resealed gradients image may be extracted. In extracting the contours, an extract contours sub-process may start at step 1718.

In general, the processing pipeline receives as input the resealed gradients images from step 1712. The sub-process processes the input images in two different ways using two sets of smoothing parameters (param 1 and param 2). Smooth filtering processes 1720a and 1720b for smoothing resealed gradients images in parallel with one another may be performed. In performing the smooth filtering at steps 1720a and 1720b, Gaussian blurs may be performed with the respective params 1 and params 2, as previously described. At steps 1722a and 1722b, contour points may be extracted. In extracting the contour points, edge detections and contours may be determined using the Canny or other edge detection algorithm. At step 1724, a selection of the contours produced by the parallel process may be based on whichever of the parallel processes (i.e., steps 1720a/1722a and steps 1720b/1722b) produced contours with more points. Also, when selecting the more appropriate set of model points, the process selects the corresponding smoothed gradients image to be used for the next iteration. The sub-process for extracting contours starting at step 1718 may end at step 1726. Thereafter, the process 1700 may return and continue from the extract contours step 1714, and the current resizing variable N may be incremented such that another iteration may or may not occur, as determined at step 1710, as previously described.

With regard to FIGS. 18A and 18B, illustrations of an illustrative template object 1800 and illustrative image 1802 with a number of features are shown. The template object 1800 is shaped as a square with a diagonal stripe 1804 and triangle features 1806a and 1806b. The illustrative process 1700 of FIG. 17 may be utilized to define model points inclusive of contours and gradients. Contours and gradients are determined to define model points associated with gradients. From the model points, the image 1802 inclusive of many features may be scanned for the template object 1800. As shown, a feature 1808 of the template object 1800 may be identified using a searching function, as previously described.

With regard to FIGS. 19A and 19B, illustrations of an illustrative template object 1900 and illustrative image 1902 with a number of features are shown. The template object 1900 is shaped as a square and is a quick reference (QR) code produced using a dot part marking (DPM) technique. The illustrative process 1700 of FIG. 17 may be utilized to define model points inclusive of contours and gradients. Because the QR code is formed using DPM, model points are generated with associated gradients from contours. From the model points, the image 1902 of a tire inclusive of many features may be scanned for the template object 1900. As shown, a feature 1908 of the template object 1900 may be identified using a searching function, as previously described.

Figure 20:
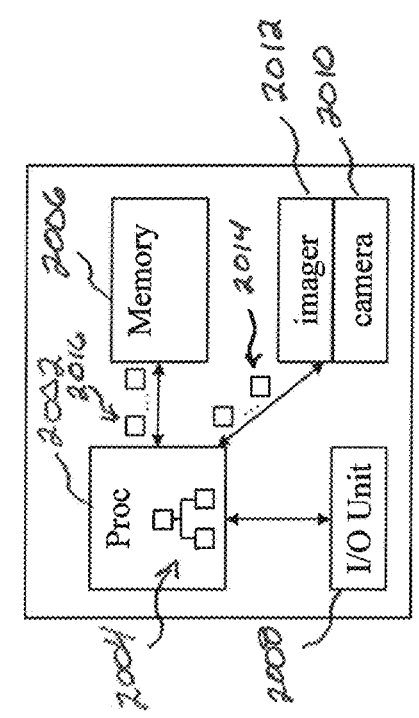
FIG. 20 is a block diagram of an illustrative system configured to perform template object matching of images.

With regard to FIG. 20, a block diagram of an illustrative system 2000 configured to perform template object matching of images is shown. The system 2000 may include a processor 2002, which may include one or more processors, that execute software 2004 to perform the template object matching. The processor 2002 may be in communication with a non-transitory memory 2006 used to store image data, for example, and an input/output (I/O) unit 2008 used to communicate data to a communications network (not shown), for example. The system 2000 may further include or be in communication, optionally via the I/O unit 2008 or a local hardwired databus, with a camera 2010 and imager 2012. The camera 2010 may be configured with optics that are used to image a scene and the imager 2012 may include an image sensor (not shown) that generates electronic data (e.g., pixels) of the scene within a field-of-view of the camera 2010. The camera 2010 and/or imager 2012 may output data signals 2014 that are communicated to the processor 2014 for processing by the software 2004. For example, if a template object is captured, the software 2004 may generate an image model with base points sets. Thereafter, if the camera 2010 is used to capture an image of a scene potentially inclusive of an object that matches the template object, then the software 2004 may determine whether the image model of the template object is within the captured image or search image. Data 2016 may be communicated from the processor 2002 to the memory 2006 for storage therein may include the raw image data 2014 or processed image data, such as the image model or data associated therewith. In an embodiment, the I/O unit 2008 may be in wired or wireless communication with a local remote communications channel for communicating data associated with template modeling.

Figure 21:
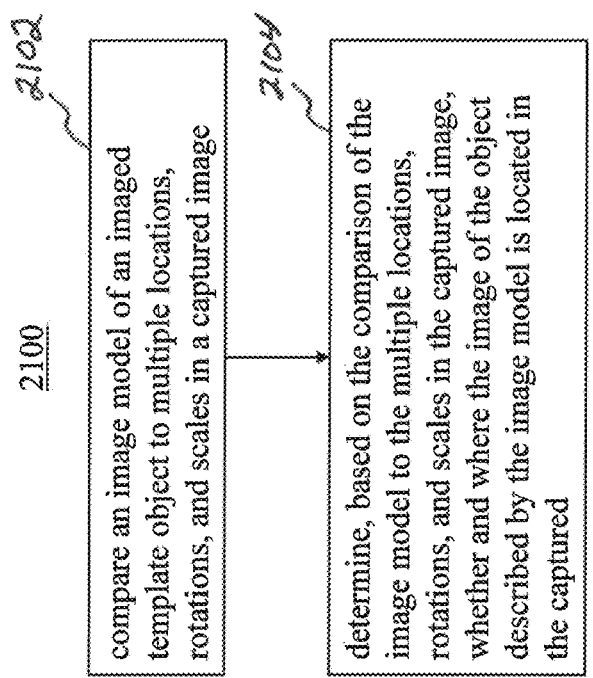
FIG. 21 is a flow diagram of an illustrative computer-implemented process for searching an image for a template object.

With regard to FIG. 21, a flow diagram of an illustrative computer-implemented process 2100 for searching an image for a template object is shown. The process 2100 may start at step 2102, where a comparison of an image model of an imaged template object may be made to multiple locations, rotations, and scales in a captured image. The image model may be defined by multiple model base point sets derived from contours of the imaged template object, where each model base point set is inclusive of multiple model base points that are positioned at corresponding locations associated with distinctive features of the imaged template object, and each corresponding model base point of the model base point sets (i) are associated with respective layers and (ii) have an associated gradient vector. At step 2104, a determination may be made, based on the comparison of the image model to the multiple locations, rotations, and scales in the captured image, as to whether and where the image of the object described by the image model is located in the captured image. In an embodiment, the process 2100 may highlight locations of the identified template object after being identified. Furthermore, the process may count a number of identified template objects in the captured image or search image. The resulting data from the search of the template object may vary and be used in a wide variety of ways, such as generating a tone, illumination signal (e.g., turn a light ON if identified), communicate the image with an identified object highlighted, etc. The system shown in 2000 of FIG. 20 and template search process 2100 of FIG. 21 may be used in a variety of different scenarios, such as object identification in a manufacturing facility, object identification in luggage, inventory counting systems, fault tolerance systems, and so on.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A computer-implemented method of detecting an image of a template object in a captured image, the method comprising:
comparing, by a processor, an image model of an imaged template object to multiple locations, rotations, and scales in the captured image, the image model defined by multiple model base point sets derived from contours of the imaged template object, each model base point set inclusive of a plurality of model base points that are positioned at corresponding locations associated with distinctive features of the imaged template object, and each corresponding model base point of the model base point sets (i) being associated with respective layers and (ii) having an associated gradient vector;
determining, by the processor, based on the comparison of the image model to the multiple locations, rotations, and scales in the captured image, whether and where the image of the object described by the image model is located in the captured image;

computing a multi-layer similarity metric by evaluating, for each model point, a score curve composed by all the scores of each point included in a corresponding base point set;
performing a peak detection of the score curve to identify a best matching layer of the model base point sets; and
filtering the score curve using a probabilistic filter to smoothen the score curve prior to performing the peak detection.

2. The method according to claim 1, wherein comparing further includes:
downsampling the imaged template object; and
comparing the downsampled imaged template object to downsampled multiple locations, rotations, and scales in the captured image.

3. The method according to claim 1, wherein comparing includes:
first comparing the image model with a subset of the model base point sets to perform a coarse search; and
second comparing the image model with more of the model base point sets than the number used for the first comparison to perform a fine search, thereby speeding up the search by first performing the coarse search and second performing the fine search.

4. The method according to claim 1, wherein filtering the score curve includes applying a different weight to different layers to give more or less relevance to external layers.

5. The method according to claim 1, wherein comparing the image model to the multiple locations, rotations, and scales includes comparing the gradient vector associated with each point of the model base point sets to gradient vectors that describe contours at each of the locations, rotations, and scales in the captured image.

6. The method according to claim 1, wherein each of the model base point sets includes at least three points, each of the first, second, and third point is associated with a respective first, second, and third contour layer.

7. The method according to claim 1, further comprising generating a plurality of contour layers by adding at least one inner point and at least one outer point relative to an edge of the template object and along the gradient vector associated with each first base model point, thereby defining a band around the first base model points.

8. A computer-implemented method of detecting an image of a template object in a captured image, the method comprising:
comparing, by a processor, an image model of an imaged template object to multiple locations, rotations, and scales in the captured image, the image model defined by multiple model base point sets derived from contours of the imaged template object, each model base point set inclusive of a plurality of model base points that are positioned at corresponding locations associated with distinctive features of the imaged template object, and each corresponding model base point of the model base point sets (i) being associated with respective layers and (ii) having an associated gradient vector;
determining, by the processor, based on the comparison of the image model to the multiple locations, rotations, and scales in the captured image, whether and where the image of the object described by the image model is located in the captured - image; and
creating an image model by:
extracting gradients from the imaged object, the extracted gradients forming a gradient image;
rescaling the gradient image of the imaged object over a number of iterations to form gradient images from a full resolution gradient image to a rescaled gradient image that meets an end condition, the gradient images including X and Y gradient images;
extracting contours of the rescaled gradient images; and
selecting edge points of the extracted contours.

9. The method according to claim 8, wherein selecting edge points of the extracted contours includes:
performing a plurality of smoothing filters in parallel on the extracted gradient images, each of the smoothing filters using different parameters;
finding contours from gradients extracted from each of the filtered images;
extracting points along the extracted contours from each of the filtered images; and
selecting a contour as the contour with the most extracted points, the extracted points associated with the selected contour being base model points of the model base point sets.

10. A system for detecting an image of a template object in a captured image, the system comprising:
an imager configured to capture images;
a non-transitory memory in electrical communication with the imager, and configured to store images of objects captured by the imager; and
a processor in electrical communication with the imager and non-transitory memory, and configured to:
compare an image model of an imaged template object to multiple locations, rotations, and scales in the captured image, the image model defined by multiple model base point sets derived from contours of the imaged object, each model base point set inclusive of a plurality of model base points that are positioned at corresponding locations associated with distinctive features of the imaged template object, and each corresponding model base point of the model base point sets (i) being associated with respective layers and (ii) having an associated gradient vector;
determine, based on the comparison of the image model to the multiple locations, rotations, and scales in the captured image, whether and where the image of the object described by the image model is located in the captured image;
compute a multi-layer similarity metric by evaluating, for each model point, a score curve composed by all the scores of each point included in a corresponding base point set;
perform a peak detection of the score curve to identify a best matching layer of the model base point sets; and
filter the score curve using a probabilistic filter to smoothen the score curve prior to performing the peak detection.

11. The system according to claim 10, wherein the processor is further configured to:
downsample the imaged template object; and
compare the downsampled imaged template object to downsampled multiple locations, rotations, and scales in the captured image.

12. The system according to claim 10, wherein the processor is further configured to:
first compare the image model with a subset of the model base point sets to perform a coarse search; and
second compare the image model with more of the model base point sets than the number used for the first comparison to perform a fine search, thereby speeding up the search by first performing the coarse search and second performing the fine search.

13. The system according to claim 10, wherein the processor, in filtering the score curve, is further configured to apply a different weight to different layers to give more or less relevance to external layers.

14. The system according to claim 10, wherein the processor, in comparing the image model to the multiple locations, rotations, and scales, is further configured to compare the gradient vector associated with each point of the model base point sets to gradient vectors that describe contours at each of the locations, rotations, and scales in the captured image.

15. The system according to claim 10, wherein each of the model base point sets includes at least three points, each of the first, second, and third point is associated with a respective first, second, and third contour layer.

16. A system for detecting an image of a template object in a captured image, the system comprising:
   an imager configured to capture images;
   a non-transitory memory in electrical communication with the imager, and configured to store images of objects captured by the imager; and
   a processor in electrical communication with the imager and non-transitory memory, and configured to:
      compare an image model of an imaged template object to multiple locations, rotations, and scales in the captured image, the image model defined by multiple model base point sets derived from contours of the imaged object, each model base point set inclusive of a plurality of model base points that are positioned at corresponding locations associated with distinctive features of the imaged template object, and each corresponding model base point of the model base point sets (i) being associated with respective layers and (ii) having an associated gradient vector; and
      determine, based on the comparison of the image model to the multiple locations, rotations, and scales in the captured image, whether and where the image of the object described by the image model is located in the captured image;
      extract gradients from the imaged object, the extracted gradients forming a gradient image;
      rescale the gradient image of the imaged object over a number of iterations to form gradient images from a full resolution gradient image to a rescaled gradient image that meets an end condition, the gradient images including X and Y gradient images;
      extract contours of the rescaled gradient images; and
      select edge points of the extracted contours, and wherein the processor, in selecting the edge points, is configured to:
         perform a plurality of smoothing filters in parallel on the extracted gradient images, each of the smoothing filters using different parameters;
         find contours from gradients extracted from each of the filtered images;
         extract points along the extracted contours from each of the filtered images; and
         select a contour as the contour with the most extracted points, the extracted points associated with the selected contour being base model points of the model base point sets.

17. The method according to claim 8, wherein the multiple model base point sets are derived from contours of the imaged template object during a training phase.

18. The method according to claim 17, further comprising computing model base points for the model base point by applying an edge detection algorithm to an imaged template object to generate data representative of contours, gradients, and edges during the training phase.

19. The method according to claim 17, further comprising associating gradient components with each base point of the multiple model base point sets during the training phase.

20. The method according to claim 17, further comprising extending the image model during the training phase by building additional shape or contour layers that are used to compute the multiple model base point sets.

* * * * *